(12) United States Patent
Allen et al.

(10) Patent No.: US 11,756,449 B2
(45) Date of Patent: Sep. 12, 2023

(54) SYSTEM AND METHOD FOR IMPROVING READING SKILLS OF USERS WITH READING DISABILITY SYMPTOMS

(71) Applicant: MAGICAL I AM, INC., Marietta, GA (US)

(72) Inventors: William H. Allen, Marietta, GA (US); Sreekanth Sunil Thankamushy, Porter Ranch, CA (US); Marcia Pierson Hart, Ketchum, ID (US)

(73) Assignee: MAGICAL I AM, INC., Marietta, GA (US)

( * ) Notice: Subject to any disclaimer, the term of this patent is extended or adjusted under 35 U.S.C. 154(b) by 0 days.

(21) Appl. No.: 17/389,802

(22) Filed: Jul. 30, 2021

(65) Prior Publication Data
US 2021/0358326 A1  Nov. 18, 2021

Related U.S. Application Data

(63) Continuation of application No. 16/933,342, filed on Jul. 20, 2020, now Pat. No. 11,094,218.

(60) Provisional application No. 62/876,326, filed on Jul. 19, 2019.

(51) Int. Cl.
G09B 19/00 (2006.01)
G06T 15/00 (2011.01)
G09B 5/02 (2006.01)
G06T 19/00 (2011.01)

(52) U.S. Cl.
CPC .............. *G09B 19/00* (2013.01); *G06T 15/00* (2013.01); *G06T 19/006* (2013.01); *G09B 5/02* (2013.01)

(58) Field of Classification Search
None
See application file for complete search history.

(56) References Cited

U.S. PATENT DOCUMENTS

| | | |
|---|---|---|
| 2010/0063822 A1 | 3/2010 | O'Brien et al. |
| 2012/0057065 A1 | 3/2012 | Tanaka |
| 2015/0332602 A1 | 11/2015 | Rastatter et al. |
| 2015/0348430 A1 | 12/2015 | Kasbar |
| 2019/0222806 A1 | 7/2019 | Soppelsa et al. |

OTHER PUBLICATIONS

The International Search Report/Written Opinion issued by the U.S. Patent & Trademark Office as International Search Authority dated Oct. 6, 2020 for corresponding International Patent Application No. PCT/US2020/042751; 8 pages.

McMahon et al., "Augmented Reality for Teaching Science Vocabulary to Postsecondary Education Students with Intellectual Disabilities and Autism," Journal of Research on Technology in Education, Dec. 9, 2015; 20 pages.

(Continued)

*Primary Examiner* — David H Chu
(74) *Attorney, Agent, or Firm* — B. Aaron Schulman, Esq.; Stites & Harbison, PLLC

(57) ABSTRACT

A system and method for teaching users reading comprehension. In an aspect, user's educational teaching system and method utilizes visual representations on a user's device display of a focusing point called a Bindu and a viewpoint called a Mind's Eye to assist in the learning of words. The combination of the Bindu with the Mind's Eye force a user to align the two with one another in order to present an unobstructed view of a 3-D representation of 2-D letters, numbers, punctuations, and words.

18 Claims, 30 Drawing Sheets

(56) References Cited

OTHER PUBLICATIONS

The Official Action issued by the Canadian Patent Office dated Mar. 14, 2022 for corresponding Canadian Patent Application No. 3,144,732; 4 pages.

The Examination Report issued by the Australian Patent Office dated Mar. 8, 2022 for corresponding Australian Patent Application No. 2020315762; 3 pages.

*The Gift of Dyslexia*

```
CATTACIADCAT
CATTACIADCAT
CALLACTADCAT
ACTTCATCAACI
ACTTCACTTCA
ACTTCACTTCA
ATCCTATCCTA
CTAATCTAATC
ATCCTATCCTA
ATCCTATCCTA
```

*Forty dyslexic variations of the word C A T.*

FIG. 3

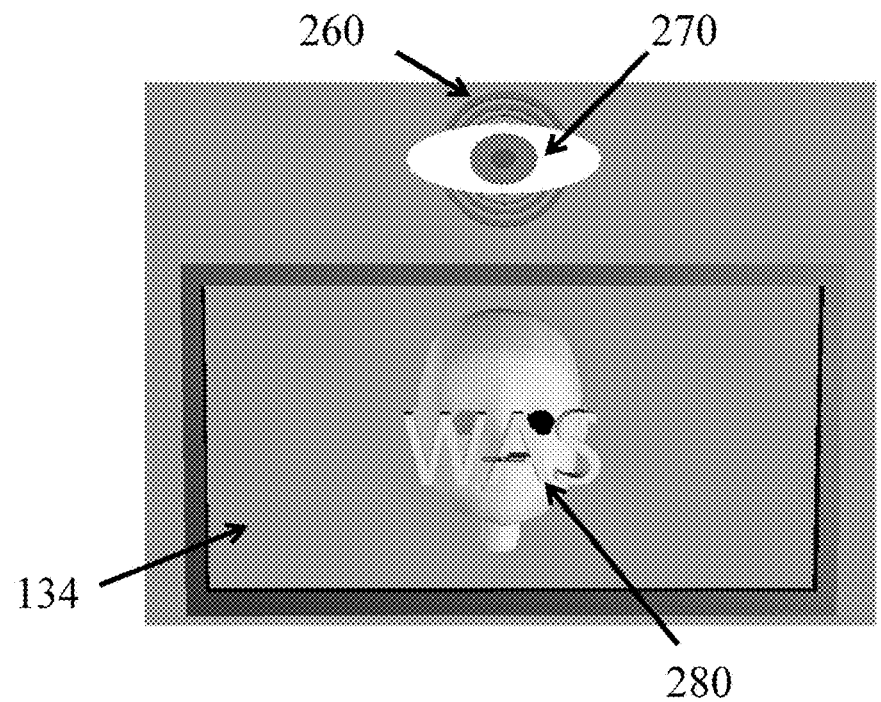
FIG. 16
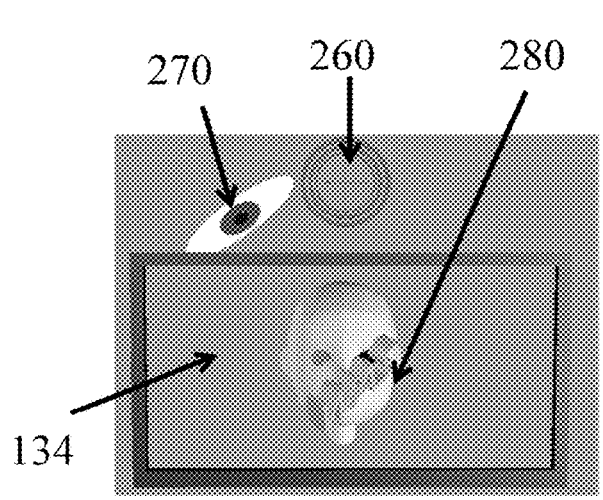 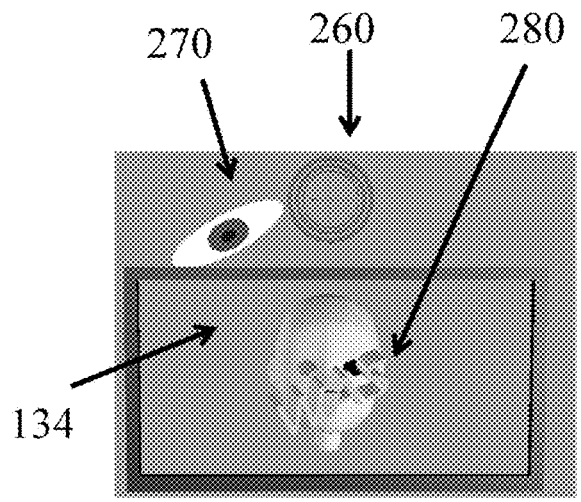
FIG. 17a  FIG. 17b

FIG. 21

PITCH

| When at: Vertical axis | | |
|---|---|---|
| Position 0 | 0% of letters inverted vertically | Like |
| Position 1 | 25% of letters inverted vertically | Like |
| Position 2 | 50% of letters inverted vertically | Like |
| Position 3 | 75% of letters inverted vertically | Like |
| Position 4 | 100% of letters inverted vertically | Like |

YAW

| When at: Horizontal axis | | |
|---|---|---|
| Position 0 | 0% of letters inverted horizontally | Like |
| Position +1 or -1 | 25% of letters inverted horizontally | Like |
| Position +2 or -2 | 50% of letters inverted horizontally | Like |
| Position +3 or -3 | 75% of letters inverted horizontally | Like |
| Position +4 or -4 | 100% of letters inverted horizontally | eLik |

ROLL

| When rotation is at degrees: | | |
|---|---|---|
| 0 | 0% of letters rotation off | Like |
| +20 or -20 | 25% of letters rotation off | Like |
| +40 or -40 | 50% of letters rotation off | Like |
| +60 or -60 | 75% of letters rotation off | Like |
| +90 or -90 | 100% of letters rotation off | Like |

| THE VARIOUS USER INPUTS | THE VARIOUS TYPES OF GAME CONTENT THE PLAYER IS EXPOSED TO ||||||
| --- | --- | --- | --- | --- | --- |
| | Mini Games | Maps to Explore | Interactions with characters | Animation clips | Rewards |
| Lesson inputs | | | | | |
| • Accuracy of Lesson quiz | Inverse | Direct | Inverse | Direct | Direct |
| • Number of attempts at Lesson quiz | Direct | Inverse | Direct | Direct | Inverse |
| • Speed of quiz completion | Direct | Inverse | Direct | Direct | Inverse |
| Adventure inputs | | | | | |
| • Accuracy of Adventure quiz | Inverse | Direct | Inverse | Direct | Direct |
| • Number of attempts at quiz | Direct | Inverse | Direct | Direct | Inverse |
| • Speed of quiz completion | Direct | Inverse | Direct | Direct | Inverse |
| Word help button input | | | | | |
| • Rate of using the word help in the last adventure | Direct | Inverse | Direct | Direct | Inverse |
| Game loyalty inputs | | | | | |
| • When the game was played last | Direct | Inverse | Direct | Direct | Inverse |
| • The average gap of time between the last three instances when game was played | Inverse | Direct | Inverse | Inverse | Direct |

FIG. 48

SYSTEM AND METHOD FOR IMPROVING READING SKILLS OF USERS WITH READING DISABILITY SYMPTOMS

CROSS-REFERENCE TO RELATED APPLICATIONS

This application is a continuation of U.S. patent application Ser. No. 16/933,342 filed Jul. 20, 2020, which claims priority to U.S. Provisional Application No. 62/876,326, filed on Jul. 19, 2019, which is relied upon and incorporated herein in its entirety by reference.

FIELD OF THE INVENTION

The invention is directed to interactive educational software that assists in users gaining reading skills as well as providing tracking components to show the progress of the acquisition of said skills.

BACKGROUND OF THE INVENTION

Reading comprehension amongst children has always been a great concern for educators. For too long, too many children leaving 3rd grade cannot read at grade level and cannot go forward in learning with their peers. U.S. statistics have not changed more than 3 points in the past 10 years, whereas other countries are making vast improvements in the reading level of their students and number of qualified graduates ready to advance the productivity of their countries. The National Center for Educational Statistics (NCES) Data in 2017 shows that 63% of U.S. $4^{th}$ grade students read below proficiency—i.e., below grade level reading and competency required to master difficult, grade level material. Half of these students reading below proficiency levels do not even read at the basic level—they cannot read fourth grade material.

One of the major problems is that some students are three-dimensional (3-D) learners, those whose thinking and learning are initiated primarily by sensory experiences, have difficulty in learning and retaining the meaning of abstract words, punctuation marks, numbers, and symbols (collectively, in either singular or multiple form, herein "Abstract Words"). The young 3-D learner, who is an intelligent child, depends on his sensory input to enable him to make sense of the world. When this child hears someone say that they built a snowman during the snowstorm yesterday, he experiences with all his senses being in the storm and building a snowman. He does not move to abstract logical thoughts about it, as a logical-thinker would. This child learns and performs well in the physical 3-D world, and yet may have difficulty with 2-dimensional (2-D) Abstract Words written on paper because sensation of them tells the child nothing of their meaning. The child who becomes a poor reader or is labeled dyslexic usually has a brain that works differently from the brain of a young reader who easily learns through phonetics training to read proficiently. The 3-D learners' highly-developed skill of processing the sensory input of the 3-D world is of no help in learning to recognize 2-D shapes of written words as phonemic symbols for sounds—related to those symbols—it is difficult for this child to link together the sounds of written letters into a meaningful word, and even harder when the word is abstract and has no physical world meaning. These 2-D words are called Abstract Words.

In the English language, 300 Abstract Words appear often in reading texts. Abstract Words, in fact, make up 85 of the top 100 Most Commonly Read Words, with FIG. 1 illustrating some of the most used Abstract Words. Teachers state that teaching K-5 children to read Abstract Words (also called Sight Words) is a continuing challenge in teaching. These words are hard to learn to read because they are abstract, and therefore they have no inherent physical 3-dimensional world association, like the concrete word "tree" has.

What does a "the" or an "is" look like? What does a "house" look like? Only the word "house" is a concrete word (i.e., representing a concrete object in the world), and it is easily associated with sensory experiences of house. There is no "the" or "is' that can be experienced in the 3-dimensional physical world. Abstract Words make up over 50% of the words read in K-5, and often become the trigger for common reading disability symptoms. This means that 50% of a sentence or paragraph has the potential to make no sense to young readers. For example, there are 13 Abstract Words in the previous sentence of 19 words and symbols. To a struggling reader, the sentence could look like: "means . . . sentence . . . paragraph . . . potential . . . sense . . . young readers . . . ." The ellipses marks indicate potential blank spaces in the sentence, the parts that a struggling reader may not be able to read.

When a reader comes across Abstract Words in a story, he may inconsistently display one or more reading disability symptoms, including: stumble, hesitate, insert word, omit word, replace word, misread a word, skip line(s), go blank, daydream, get frustrated or a combination thereof while reading. The more stress builds while attempting to read, the more the child is likely to show reading disability symptoms. This incorrect reading behavior is a moment of interruption that can cause the young reader to lose comprehension of what they are reading. The inherent problem is the inability of the young, 3-D thinker to make meaningful, experiential sense of Abstract Words that are seen on paper.

Abstract Words can remain a stumbling block into adulthood because many individuals remain predominantly 3-D thinkers, and they have never had been taught, using their 3-D learning style, how to read Abstract Words. 3-D thinking adults are capable of "thinking out of the box", are very intuitive, and can discover solutions that predominantly logically-thinking minds do not imagine. This is the gift of the 3-D thinker. However, it is also an impediment to learning to read and write text that is flat, 2-D text.

Popular approaches used to teach children how to read are phonics and phonemic awareness. However, these methods fail to teach a large number of the children in K-5 how to read Abstract Words. Phonics, like our written language, is an additional abstract symbolic, auditory-visual "language" taught in addition to the "language" of symbolic recognition and the meaning of all written letters, words, symbols, punctuation marks, and numbers. A young learner is required to learn all of these "languages" (codes representing words and their meaning on paper) in order to read. The proficient young reader is one who moves beyond his early predominant sensory-lead thinking (initiates thinking and learning with sensory experiences; big picture viewpoint), into predominantly logical-lead thinking (initiates thinking by analyzing the parts of an object or even, and synthesizes them into a recognizable whole if possible). He becomes adept at using the phonics platform, and is able to logically shift into understanding and reading Abstract Word(s). However, over 63% of children in K-5 are below proficiency reading level. These children cannot read proficiently enough to read to learn at their grade level, and they need instruction that works with their predominant sensory-lead thinking style.

Memorization and rote drilling are the favored tools used to teach children to "read" lists of Abstract Words. However, memorization and rote drilling do not give any meaning to Abstract Words. No matter how much a 3-D learners practice memorizing Abstract Words, he continues to have great difficulty thinking and understanding while reading them in context (e.g., in a story). His storyline focus can be lost each time he is interrupted by words he cannot recognize and understand. The more interruptions occur, the more confusion and frustration build. When brain processing becomes disintegrated by the stress of interruptions and the building confusion, it can no longer operate optimally. With this loss of brain loses, the dyslexic (or anyone!) cannot use all the resources of his brain to resolve the conflict at hand, and he usually resorts to unconscious coping compensating behaviors (guessing, fidgeting, day dreaming, avoidance behaviors, giving up) to reduce the discomfort of his frustration. Confusion and frustration lead to a lack of understanding. The child needs a way to reduce his stress and discomfort, to be distracted from the stress of the confusing task at hand so he can regain brain integration. The laborious drill of rote practices often used to teach Abstract Words increases the stress, confusion, and likelihood of compensating behaviors to take over a child's behavior.

Many educators believe that their work provides a multi-dimensional, multi-sensory teaching experience for their students. They may use shapes, color, drawing in sand, or tracing letters to augment the child's experience of letters and words. Although their techniques do involve additional sensory input of different kinds to teach, their focus remains on the 2-D attributes, rules, and phonetics of letter symbols found in written words on a flat surface. With this approach, the 3-D thinking students lack experiencing all the needed levels of simultaneous multi-sensory input their thinking requires to give meaning to Abstract Words.

In order to combat the perpetual problems of 3-D learners viewing 2-D symbols and words, various educators have implemented a visual solution around a concept called the Mind's Eye. Vision is regulated by the visual cortex in the brain—an area at the rear of the cortex of the brain that processes sensory information that enters the body through the physical eyes. Vision is also regulated by a complex internal processing of all sensory input (that is, processing of the multi-sensory perception of all the senses), memory, imagination and concepts. The "brain is what sees, not the physical eyes." The composite of the above-mentioned brain functions generates "what is seen" internally by the "Mind's Eye." The perception of the Mind's Eye is like having "eyes" attached to the "mind." (Colin McGinn. Mindsight: Image, Dream, Meaning. Cambridge, Mass.: Harvard UP pp 3-5, 121-122, 162-163: 2004. "On Seeing with Body's Eye and the Mind's eye." 2004.)

The Mind's Eye is that part of the individual that internally "sees." It recognizes an external object or words as a result of the composite construction of the incoming external stimulation of all the senses being processed in the brain areas that register and associate all sensory perception, associated memory, imagination and concepts.

To understand how the Mind's Eye works, imagine your house. A house is an external object, it is concrete, and its word-label inherently contains meaning when associated with its physicality. The Mind's Eye has an easy task of compiling the internal composite of sensory input of house and easily makes "sense" of the external word "house." When an external object is labelled by a written word, it is two-dimensional (flat on the flat printed page) and the letters are abstract. The Mind's Eye manipulates sensory inputs as the Mind's Eye rapidly surveys and reviews, almost instantly, a large assortment of composite renderings ("views") in an attempt to "give concrete (sensible) meaning" to the external object, which can be done easily with a familiar, external object like house.

Next imagine "the" . . . what do you see? When asked, most see the word "the" or nothing at all. There is no sensual perception that is related to and gives meaning to the Abstract Word "the." When none of the Mind's Eye perceptions (i.e., its assortment of composite sensory renderings) provide meaningful experience of a word, the word remains as an unrecognizable object to the Mind's Eye. Sometimes in its shifting perspectives, the Mind's Eye misperceives the word as one it already knows how to perceive (e.g., it sees the word "was" as the word "saw"); or it may perceive a whole new configuration of the letters of the word "was," perhaps "mas" which is nonsense in the Mind's Rye. FIG. 2 provides an illustration of what can be seen. FIG. 3 also shows a representation of 40 different ways a dyslexic individual could see the word "CAT." (Ronald Davis, The Gift of Dyslexia, p 80.)

When a Mind's Eye rendering creates something that the Mind's Eye already "knows," then the Mind's Eye perceives the external object in a way that seems to be consistent with how most of us see that object. Until then, the Mind's Eye continues to move around rapidly to different viewpoints, producing many images that "make no sense", with no useful associated information, and brings up instead lots of sensory confusion. When reading words of any kind in a 2-D format, the young reader's individual senses can become easily confused. Abstract Words literally don't make sense to him. Confusion builds as his Mind's Eye attempts to find an acceptable and useful interpretation of them. This confusion leads the child into a state of brain disintegration (poor processing ability); confusion reigns as frustration builds. Many educators do not recognize that "confusion when reading" is what stimulates the Mind's Eye to roam and seek a recognizable solution, and that this usually causes a reading disability symptom in the process.

The concept of the Mind's Eye has been used as a focusing and "seeing" tool in art education and healing since at least 1980. (Samuels, Mike, M.D. and Nancy Samuels. Seeing with the Mind's eye. Random House, Bookworks: 1980) and (The Energy Kinesiology work of Charles Krebs, PhD, researcher of how the brain learns and creator-teacher of L.E.A.P. Program, SLC, UT, 2003-2006 classes). The concept of the Mind's Eye is used by Ronald D. Davis in his Davis Dyslexia Association International (DDAI) reading program. DDAI works with the concept of an Orientation Point to orient the Mind's Eye perceptions. DDAI also teaches how to read 217 Abstract Words with the use of clay constructions to teach the three parts of each Abstract Word: (1) what it looks like; (2) what it sounds like; and (3) what it means.

There are dozens of methods currently being used to address dyslexic students, such as, but not limited to, Wilson Learning, Sylvan Training, Hooked on Phonics, and Orton-Gillingham. All of these programs use a form of the methodology of phonics and/or phoneme awareness. None of these methods teach the multi-dimensional, sensory-thinking student in the 3-D realm of his thinking how to master the three parts of an Abstract Word; nor do they teach the dyslexic or early reader about the correct utilization of the Mind's Eye. The key to successful reading is learning to manage the Mind's Eye and to master, concurrently, all three parts of a word or symbol: again, (1) what the word looks like; (2) what it sounds like; and (3) what it means. These are the two critical and most overlooked steps to correcting reading disabilities associated with the young reader and the dyslexic.

Therefore, there is a need for a system and method that helps readers utilize and stabilize their Mind's Eye, and learn in the style of their 3-D thinking, through 3-D experiences, to master at the same time, the three parts of an Abstract Word—(1) what it looks like, (2) what it sounds like, and (3) what it means. Then the user can begin to use these words and symbols correctly, meaningfully, and fluidly in written sentences—regardless of origin (e.g., written text, digital screens, signage, etc.) and read them without succumbing to reading disability mistakes.

SUMMARY OF THE INVENTION

The invention is directed to an educational teaching system and method for improving the reading comprehension of dyslexics, young readers, and 3-D learners. In an aspect, the educational system and method utilizes visual representations of a focusing point and the view of the Mind's Eye of the user on a display screen of a user's device (e.g., tablets and smart phones) to assist in the learning of words. The combination of the focusing point, referred to as the Bindu, and the Mind's Eye force the user to align a 3-D version of a 2-D word in the correct alignment in order to assist the user in fully understanding the word. These and other concepts will be discussed in detail below.

In an aspect, the invention is directed to a method for improving reading skills of a user through use of a mobile device, the method including the steps of generating a graphical representation of a focusing point called a Bindu on the display of the mobile device, the Bindu presented above a head of the user, generating a graphical representation of a focusing point called a Mind's Eye on the display, and generating learning elements on the display, wherein the learning elements are shown in an unobstructed view when the Mind's Eye is aligned with the Bindu. In an aspect, generating the Bindu includes capturing images of the head of the user with a mobile device, displaying images of the head of the user on a display of the mobile device, and generating the Bindu on the display, wherein the Bindu is in a fixed position in relation to the head of the user, moving with the head of the user as the head of the user moves. In such aspect, the Bindu is placed in a fixed position in relation to the head of the user by generating a mapped virtual head of the user head, establishing a center point of the head, and placing the Bindu at a fixed distance from the center point.

In an aspect, the movement of the Mind's Eye is tied to the rotational movement of the mobile device by the user, wherein the user rotates the mobile device in order to align the Mind's Eye with the Bindu. In such aspects, the spatial orientation of the learning elements are tied to the location of the Mind's Eye in relation to the Bindu, wherein the spatial orientation of the learning elements produces an obstructed view of the learning elements when the Mind's Eye is not aligned with the Bindu. In an aspect, the learning elements comprise 3-D representations of 2-D letters, numbers, punctuation, and abstract words. In another aspect, the invention is directed to an educational teaching system for improving reading skills of users with reading disability symptoms, the system comprising a mobile device. The mobile device can include memory, a processor, a front facing camera, a display, the front facing camera oriented with the display, and input/output devices. The processor is configured to capture images of the user from the front facing camera, create a virtual mapped version of a head of the user, create a focusing point called a Bindu, the Bindu put into a locked positional relationship to the mapped head of the user. In an aspect, the Bindu is created by finding a center point of the virtual mapped head of the user and placing the Bindu at a given distance above the center point, which can be three inches.

In an aspect, the process can also be configured to create a graphical representation of a viewpoint called the Mind's Eye create learning elements. The learning elements take a three dimensional (3-D) form. In addition, the Mind's Eye and the learning elements are in a positional relationship with the mobile device in relation to the head of the user, such that the Mind's Eye moves around the display in relation to the Bindu as the mobile device is rotated. In addition, the spatial orientation of the learning elements is in relation to the position of the Mind's Eye such that when the Mind's Eye is aligned with the Bindu, the learning elements are aligned in an unobstructed correct alignment. When the Mind's Eye is not located on the Bindu, the learning elements are aligned in an unobstructed spatial view.

In an aspect, the input/output devices include a gyroscope configured to measure the rotational movement of the mobile device. The gyroscope provides the change in the rotational movement to move the Mind's Eye in relation to the Bindu as the mobile device is rotated. In an aspect, the Mind's Eye is created by the system by generating a virtual grid that is locked to the mapped head of the user, where the Mind's Eye moves within the virtual grid. In such aspects, the virtual grid can include a yaw axis, a pitch axis, and a roll axis, where the yaw axis corresponds to a yaw rotation of the mobile device, the pitch axis corresponds to a pitch rotation of the mobile device, and the roll axis corresponds to a roll rotation of the mobile device. In addition, the virtual gird can include points at which the axes intersect. The Mind's Eye can be generated at one of the points. These points can dictate the required rotations needed to move the Mind's Eye to align with the Bindu. In addition, the points can dictate the spatial orientation of the learning elements as initially displayed on the device.

BRIEF DESCRIPTION OF THE DRAWINGS

FIG. 3 is a representation of 40 different ways a dyslexic individual could see the word "CAT".

FIGS. 14-17a-f illustrate representations of the relationships of the Bindu, Mind's Eye, and learning elements with one another according to aspects of the present invention.

FIG. 21 is a schematic representation of the orientation of components of learning elements based upon the position of the Mind's Eye on the virtual grid of FIG. 18.

FIG. 48 is a representation of relationships between various user inputs and various types of game content provided to a user according to an aspect of the present invention.

DETAILED DESCRIPTION

Figures 1, 2:
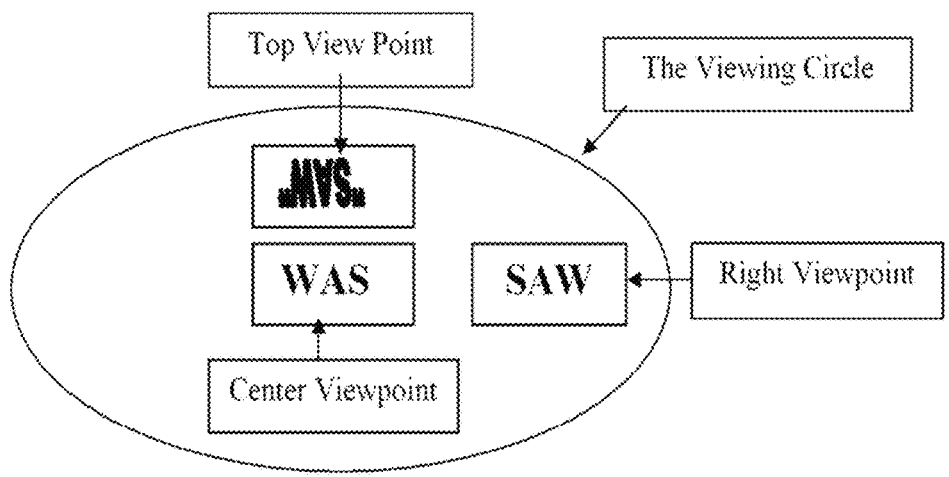
FIG. 1 illustrates examples of abstract words.
FIG. 2 is a schematic representation of how a word can be viewed in the Mind's Eye.

Embodiments of the invention will be described more fully hereinafter with reference to the accompanying drawings, in which embodiments of the invention are shown. This invention may, however be embodied in many different forms and should not be construed as limited to the embodiments set forth herein; rather, these embodiments are provided so that this disclosure will be thorough and complete, and will fully convey the scope of the invention to those skilled in the art.

Definitions

3-D Learners and Thinkers—individuals whose thinking and learning style is initiated primarily by sensory experiences. They tend to be gestalt-lead thinkers Gestalt-lead thinkers—they first perceive the big picture, not its parts, and this stimulates their perception, thinking and learning. They tend to run (take part in) experiential internal "movies" of their perceptions in their Mind's Eye.

Logic-lead thinkers—perceive and analyze the parts immediately, rather than focusing on the big picture, and can combine the parts into a composite identification of the whole of what was experienced. They think about their sensory experiences, rather than being inside an inner "movie" of them.

Reading Disability Symptoms—errors made in reading, out loud or quietly to oneself. Common symptoms are defined when one: stumbles, hesitates, inserts word, omits word, replaces word, misreads a word, skips line(s), goes blank, daydreams, or a combination thereof while reading.

Abstract Word(s)—the term used herein to include alphabet letters, numbers, abstract words, punctuation marks, and other symbols. A few Abstract Word(s) include and not limited to: I, who, two, 2, to, too, on, b, ?, for, 4. See FIG. 3 for more examples. Since they are abstract, they have no inherent meaning to be sensed with the physical senses. When referenced herein, Abstract Words encompasses a singular and plural nature.

Concrete word—a word naming an object, thing, person that can be experienced with the physical senses. e.g., tree, house, man, lemon.

Symbol—can be a letter, number, punctuation mark, or other abstract mark indicating an object (as in a word, number, alphabet letter, a formula), or a process (as in punctuation).

Punctuation—abstract symbols used by the author to establish the context of the story he is writing. There is a rhythm of reading to the punctuation mark, and pausing for the amount of time indicated by the kind of mark. This helps the reader understand the story read that far. E.g., a period requires a stop of a count to 3; while a comma requires a pause of 1 count.

Mind's Eye—a construct of the mind created by the input and sub-cortical manipulation of all sensory information, not just visual input of the eyes, that is like the mind having "eyes that see" both internally and externally. It is the part that "sees" both the internal and external worlds of the viewer; it sees the imagination, dreams, experiences of the viewer. When it changes its location, its viewpoint changes, creating a different representation of what is viewed. The Mind sees, not the eyes as they only register differences in light and shapes.

Bindu—an imaginary focus point. When the Mind's Eye is stabilized on it, the viewer consistently sees the same view of an image, word, and/or symbol.

Bindu M.E. Tech™—is a game mechanic designed for this teaching system. It teaches the user how to stabilize his Mind's Eye on his Bindu point for consistent perception, comprehension and fluid reading.

Alphabet Mastery Game—teaches the user how to accurately and consistently identify the shape and orientation and name of an alphabet letter, both lower case and upper case.

Spell Word—One of the 300 abstract words and symbols to learn to recognize and read fluidly.

Mantra—the sensory information (what a whole word looks like, what a whole word sounds like, and what a whole word means) to be learned to recognize and read fluidly an abstract word known in system as a Spell Word.

Lesson—also known as a Spell in this system; teaches use of the mantra of a new Spell Word (abstract word or symbol).

Sentence Quiz—a test of the user requiring him to identify the sentences correctly using the Spell Word among a group of correct and incorrect sentences.

Wizard Tales—the reading adventure stories of this system, requiring the reading of previously learned Spell Words. New words the user may not know are explained in a Glossary that is available within the story of a Wizard Tale.

Glossary—collection of new words that the reader of Wizard Tales may not already know; it is available during a Wizard Tale.

Spell Book—a collection of all the Spell Words (Abstract Word(s)) that have been learned; available on most screens of this system so the user can review and relearn a Spell Word when he needs to.

Comprehension Sentences—after each reading section of a Wizard Tale, the user must pick from a group of sentences the ones that explain the action and content of the story he just read.

Mastery—reading mastery is demonstrated when a user can read fluidly, with comprehension, through Abstract Words(s), every time they are met in written text.

Dot Com Dash game—is a game that teaches how to stop at punctuation marks in order to know what the author is saying in his story or directions.

Specific techniques are required by the young reader to "make sense of" Abstract Words so that he can learn to read and write them. The problem is so simple that it is rarely recognized by teachers and parents. What is lacking in mainstream education is the understanding that these Abstract Words gain meaning when they are associated with concurrent, concrete, sensory experiences of simultaneously providing the look, the sound, and the meaning of the whole word, and also the look, sound, and use of punctuation marks and symbols.

The recent discovery of the existence of multi-sensory neurons (single neurons in the brain that process several kinds of sensory input) in the brain has provided a key to understanding why a multi-sensory presentation of letters and core foundation words in both 2-D and 3-D formats has been so successful in assisting dyslexic children to learn to read. Using a 3-D presentation of core words, of their look (i.e., how the whole word is spelled), of the sound of the whole word, and, and of their meaning, and linking this data to the powerful senses of touch, sight, sound, motion and imagination, dyslexics can utilize their best-developed senses to overcome their deficits in phonetic processing. (Charles Krebs, Multi-Sensory Neurons and Symbol and Word Recognition, SLC, 6-23-08.)

When there is a 3-D experience of the three essential parts of a symbol or word, which provides sensory meaningful experience concurrent with a sensory experience of what the symbol or word looks like, what the word sounds like, the visual and auditory symbols of the word can be linked together by a user's brain to create meaning and recognition of Abstract Word(s), and therefore the meaning of the sentence being read. In order to process 2-D symbols (flat letters) into meaningful 3-D words, the brain must be integrated so that it can simultaneously link the input of several senses (visual, auditory, feeling and movement) to give the "flat" symbols or words a 3-D context. The brain must integrate what the whole word looks like, what the whole word sounds like, and what the whole word means . . . all this happens below conscious awareness.

Thus, by practicing the combination of recognizing and saying the letters of a word, sounding the whole word, and giving its definition, while at the same time both seeing and feeling its 3-D representation, it is possible to create the essential links between the 2-D appearance of these letters and words, the sounds associated with these whole words, and their meaning. The present system and methods are directed at capturing the linking of a 3-D representation experience with a 2-D appearance. The invention stimulates the mastery of a word, punctuation mark, or symbol (collectively "Abstract Words") through digital experiences that builds the user's ability and knowledge to use all three parts of a word, i.e., what the written whole word looks like, what the whole word sounds like, and what the whole word means, to form a sentence and read the word in text. This is applicable whether the user is dyslexic, a struggling reader, a new reader, or a young reader.

In order to utilize this type of learning, it is critical for Mind's Eye of the user to be stabilized. As discussed above, the Mind's Eye is an intangible co-function of the mind and the brain. The Mind's Eye—not the physical eyes—is what "sees" the internal images, thoughts, memories, dreams, the objects of an individual's imagination, as well as the objects and activities of the external world, whether the eyes are open or closed.

When confused, the Mind's Eye of the user, including 3-D learners, dyslexics, and young readers, can rapidly, seemingly instantly, change its "viewpoint" in order to gain a perspective of sensory input that "makes sense" of it—the Mind's Eye is looking for a view of the word or symbol where it can recognize the sensory input as something already known. The shifting of the Mind's Eye, however, is seldom noticeable to the person or to observers as it occurs in the realm of subliminal thought. Observation during the Mind's Eye perception demonstrations have shown that the perceptions of 3-D learners vary when their Mind's Eye is not located consistently on a particular focusing point. When someone with a stabilized Mind's Eye consistently and repeatedly perceives an object in the same way, that is the only view that person has of the object. A person who has a roving Mind's Eye, as many dyslexic individuals have, unconsciously reviews many perspectives of the object to gain recognition of it. That person can instantly see the object from front, back, each side, top, bottom, inside, outside, upside down, side to side rotation, and all angles in between. If recognition of the object, say an abstract word, does not occur, the person is caught in the mass of sensory confusion generated by the roving Mind's Eye. When this happens to a young reader, his ability to read the word or continue to understand the storyline is interrupted and often derailed. Therefore, it is essential for the young reader to become aware of how to stabilize his Mind's Eye in a position of reliable focus that he can trust. Then, the Mind's Eye gives that same perception joined to the same brain recognition pathways of it each time it sees the external objet, and the user can being to learn to read fluidly with comprehension. Once the user has mastered the three parts of an Abstract Word, the user no longer has to consciously mentally review the three parts in order to read fluidly through it. This is how he knows he has mastered the word.

Therefore, there is a need for a system and method that teaches 3-D thinking users in their 3-D thinking style to stabilize their Mind's Eye. This is especially the case when the 3-D thinking users, dyslexics, and young learners, are attempting to master Abstract Words. In an aspect, the system and method, collectively called the Bindu M.E. Tech create a focusing point, or a Bindu as referred to herein this application, for stabilizing the view of the Mind's Eye. When the Mind's Eye is imagined to be positioned on the Bindu by the user, he can consistently recognize a 2-D word in order to correctly see/read the word.

The concept of the Bindu has been used since early times in yoga to identify the point, dot, junction where brain input converges into one point of perception and recognition. Here in this imaginary point of focus, energy is integrated to stabilize the perception of the individual. In regards to the educational teaching system of the present invention, the concept of the Bindu as a point of perceptual convergence and recognition is used as a location for stabilizing the Mind's Eye and consistently viewing a word the same way each time it is seen. Once a user learns to imagine his Mind's Eye positioned on his Bindu, he can consistently perceive one version of the word; and sees the word the same way the next time he views it. This is essential for learning to read, especially Abstract Words, and particularly for 3-D learners. The educational teaching system teaches a user how to stop his perception of a word or symbol from repeatedly shifting. Putting an end to the "perceptual hopping around" of the Mind's Eye minimizes stress and confusion of the senses. Then, when the 3-D learner meets new Abstract Words, his brain is more integrated, and it is more likely he will recall what he has learned about words and symbols because he sees (experiences) them clearly, without mistakes in perception. By addressing how the word is seen, the other two essential parts used and needed to learn a word, what the word sounds like and what it means can be conveyed without confusion.

In an aspect, the educational teaching system and method teach a user how to read accurately and consistently a 2-D word by placing a representation of his Mind's Eye on a representation of his Bindu—focusing point—in a visual plane visible by the user. In such aspects, the educational teaching system and methods utilize 3-D representations of a 2-D word displayed on a visual display or screen. The educational teaching system and method utilize user devices (e.g., tablets, smart phones, etc.) to find the position of the user's field of view or visual plane, create a Bindu location within the visual plane of the user, assign a correct view of a 3-D representation of a word, or letter, within the user's Mind's Eye, and then insure that the user correctly aligns the appropriate Mind's Eye view of the word with the Bindu (focusing point). The educational teaching system and method can then provide, by means of positive reinforcement, for the user to continue to properly align his perception of the word and retain the proper perception of the word for reading comprehension. In addition, the educational teaching system and method can also track the progression of the user through various activities, including the use of analytics. These and other aspects will be discussed in detail below.

In an aspect, the educational teaching system teaches a user how to place his Mind's Eye on the viewpoint above the center of the top of his head (his Bindu) to stop his perception of a word or symbol from repeatedly shifting. This ends the "perceptual hopping around" of the Mind's Eye and minimizes stress and confusion of the senses. Then, when the user meets new Abstract Words and he imagines his Mind's Eye on his Bindu, his brain is more integrated and he is more likely to unconsciously recall what he has learned about Abstract Words and reads fluidly through them. This is the benefit of (experiencing) them clearly, without mistakes in perception.

Figure 4:
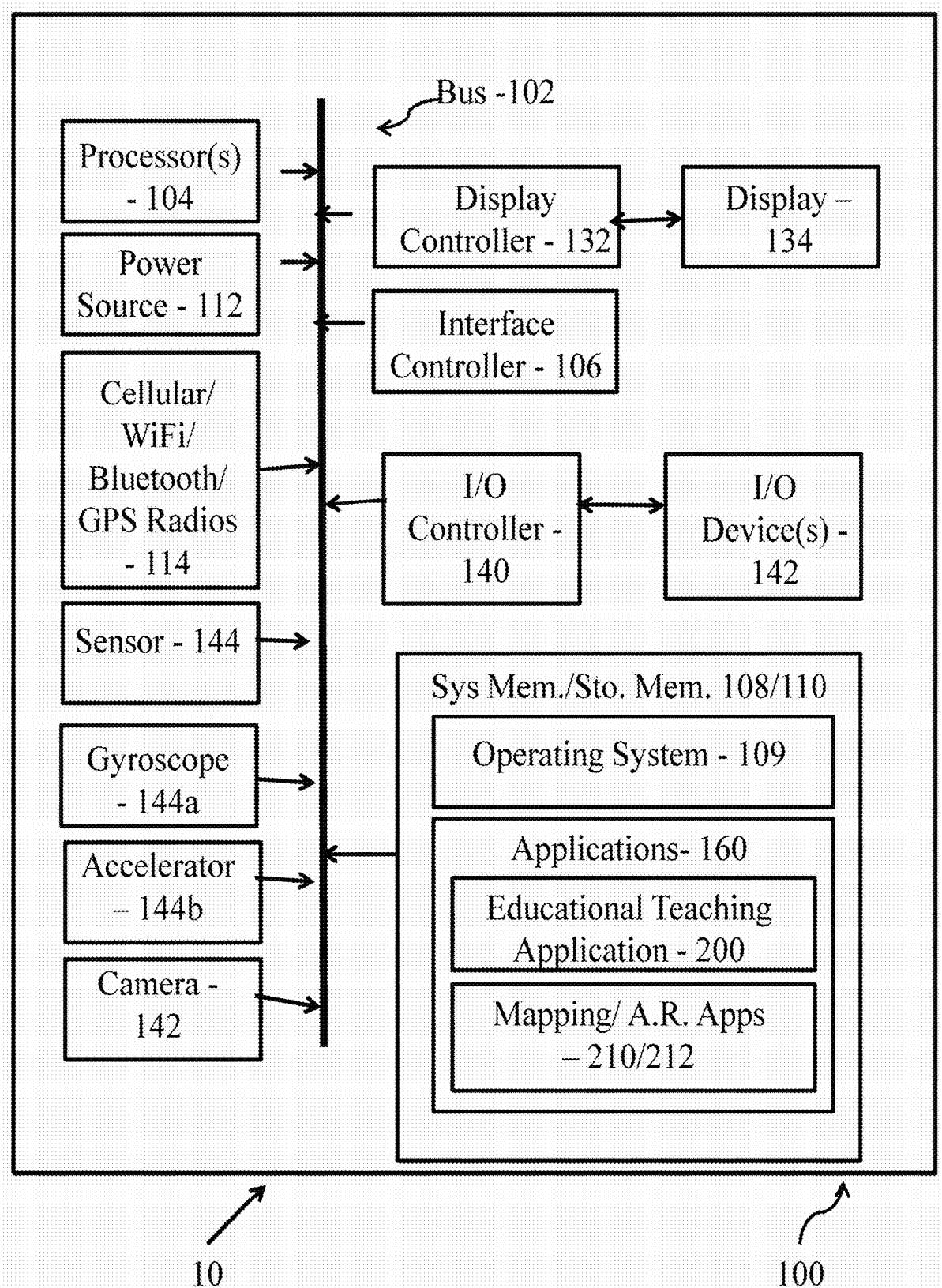
FIG. 4 is a schematic representation of a mobile device according to an aspect of the present invention.

In an aspect, the educational teaching system and method utilize mobile devices (e.g., smart phones and tablets) which have certain built-in hardware (e.g., a display panel, a front facing camera, gyroscope, and accelerator) to carry out the functionality of the invention. These hardware components can be found on standard mobile devices, and are well known in the art. In an aspect, the mobile devices incorporate computer software (e.g., the system can utilize a specially designed game application that the user installs by downloads from an application store, like the Google Store and the Apple Store) that interacts with the hardware components of the mobile device as discussed above. FIG. 4 is a diagram of a mobile device 100 that is utilized by the educational teaching system 10 according to an aspect of the present invention. The mobile device 100 includes a computer bus 102 coupled to at least one or more processors 104, one or more interface controllers 106, system memory 108, data storage 110, a power source 112, communication means 114, sensors 120, user interfaces 130, display controllers 132, and displays 134. The power source 112 for the mobile device 100 may be a plug-in, battery, fuel cells, solar panels for receiving and storing solar energy, or a device for receiving and storing wireless power.

The processor 104 can contain a plurality of processers 104. In an aspect, the processor 104 can be a general-purpose processor, a special-purpose processor, a conventional processor, a digital signal processor, a plurality of microprocessors, a controller, a microcontroller, single core processor, a multi-core processor, an Application Specific Integrated Circuit, a Field Programmable Gate Array circuit, or any other type of integrated circuit. The system memory 108 can also house the operating system 109 and various applications 160.

The display controller 134 connects to one or more displays 134. The one or more displays 134 may include a touch screen display 134. In an aspect, the touch screen display 134. In an aspect, the display devices 134 can include a liquid crystal display, light emitting diode display, field emission display, organic light-emitting diode display, flexible organic light emitting diode display, or the like. Input/output (I/O) controllers 140 and I/O devices 142 are connected via the computer bus 102. The I/O input devices 142 can include, but is not limited to, side buttons, a touchscreen, a speaker, microphone, keyboard, keypad, touchpad, display, touchscreen, wireless gesture device, a digital camera, a digital video recorder, a force-feedback device, or the like. In an exemplary aspect, the I/O devices include at least a touchscreen, a front facing camera, buttons, microphones, and sensors, as discussed below.

The mobile device 100 can include a plurality of sensors 144. As shown in FIG. 1, the sensors include motion sensors 144a-b, which can include a gyroscope 144a and an accelerator 144b. However, the sensors 144 can additionally include, but are not limited to, one or more other motion sensors capable of determining pitch, roll, and yaw, (discussed below), proximity, light, optical, chemical, environmental, moisture, acoustic, heat, temperature, RFID, biometric, face recognition, image, photo, or voice recognition sensors and touch detectors (not shown) for detecting any touch inputs, including multi-touch inputs, for one or more display devices. Sensors can further include, but are not limited to, an accelerometer, an e-compass, gyroscope, a 3D gyroscope, or the like. One or more interface controllers 106 may communicate with touch detectors and I/O controller 140 for determining user inputs to the mobile device 100. Coupled to one or more displays 130 may be pressure or capacitive sensors 144 for detecting presses on one or more display 130. The mobile device 105 can include various radios 150, including, but not limited to, Wi-Fi, Bluetooth, GPS, Cellular, NFC, and the like, for communicating with other devices.

The mobile device 100, the system memory 108 and storage memory 110 may be any disk based or solid-state memory device for storing data, including volatile or non-volatile memory. The system memory 108 and storage memory 110 can host the operating system 109, and also store applications 160, including the educational teaching application 200, discussed in more detail below.

In an aspect, the user interacts with the educational teaching application 200 via a user interface 142 such as a touchscreen display 134 on the mobile device 100. In an aspect, the educational teaching application 200, through calling on inputs and other software applications, orchestrates the hardware to create a set of controls, captured via the I/O devices 142, for the user. In an aspect, the touchscreen display 134/142 is capable of displaying images and receiving input (e.g., the user carrying out actions via interacting—tap, swipe, hold, press, with fingers—with displayed controls and images moving digits on the screen) from the user. In an aspect, the other I/O devices 142, including the sensors, can measure the movement of the mobile device—pitch, roll, and yaw—to take inputs of the user.

Figure 5:
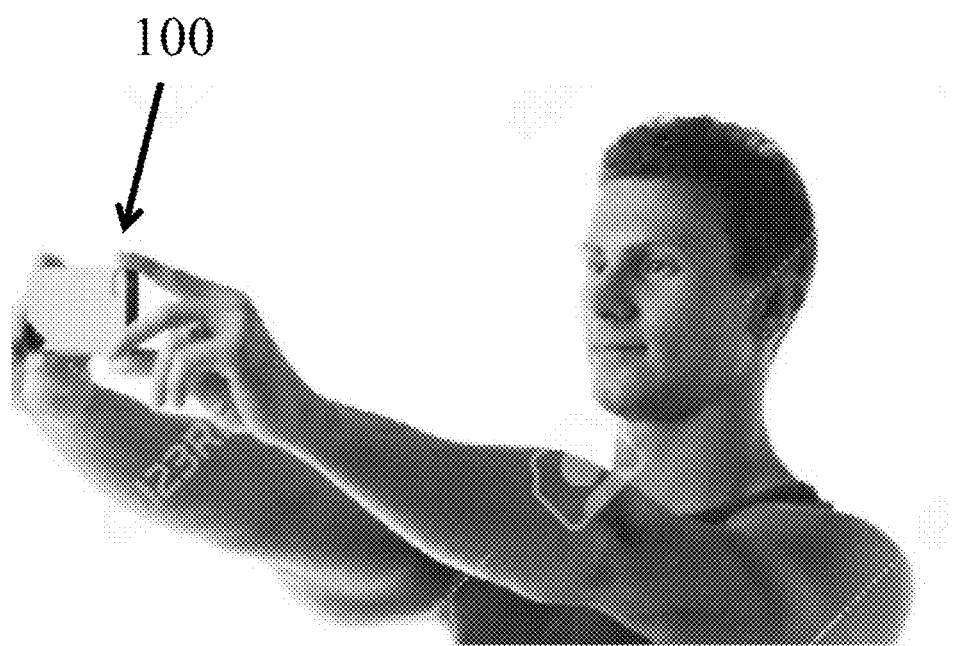
FIG. 5 illustrates a correct position for the user using the mobile device according to an aspect of the present invention.
Figure 7:
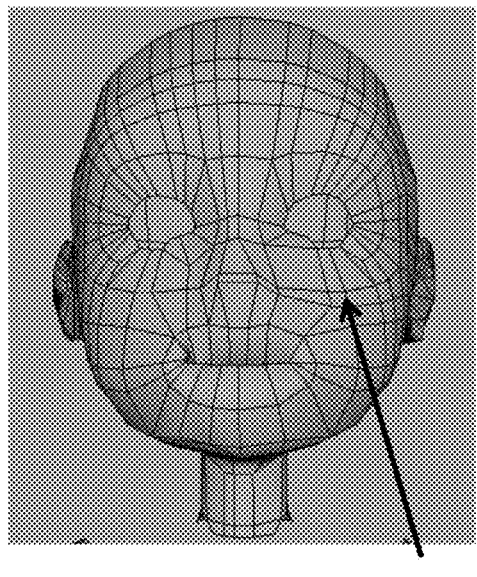
FIGS. 7-13 illustrate how the visual representation of a Bindu/focusing point is established according to aspects of the present invention.

In an aspect, the educational system 10 utilizes known mapping and augmented reality technology, via mapping applications 210 and augmented reality applications (AR Apps.) 212, in conjunction with a camera 142 oriented in the same direction as the display 134 and a gyroscope/accelerator combination 144a-b, to track the view point of the user and then display content. For example, a front facing camera 142 of the mobile device 100 captures images of the head shape of the user (see FIG. 5), and communicates those images back to the software in order to map the shape of the user's head, as shown in 7. This can be done through mapping software available on the market and well known in the art. The mapping of the head 250 is a virtual object, and is not actually visible by the user on the display 142. The mapped head 250 is used by the application 200, via the mapping and AR applications 210/212 to keep track of the position of the head within the plane of view of the camera 142 and display 134, as well as the learning elements discussed below.

As discussed previously, the Bindu 260 is an imaginary point of focus on which the user learns to position his Mind's Eye 270 so he can clearly and consistently see words and symbols. The educational teaching system 10 generates graphical representations of the Mind's Eye 270 and Bindu 260 in relation to his head on the display 134 of the mobile device 100. In an aspect, the Bindu is mapped in a fixed relationship to the head of the user. As discussed above, AR software may be utilized to map the player's head to create a 3-D virtual representation of the head 250 and the Bindu 260. Once the head is mapped, the AR software can be utilized to identify and track a fixed location of the head 250 of the user. In other words, a center point of the head 250 of the user is generated and tracked. The establishment of the Bindu 260 is done by defining a point offset 262 in relation to the virtual mapped head 250, which tracks the movement of the user's head as captured by the camera 142 via the mapping and AR applications 210/212. In an aspect, the point offset 262 is made in relation to a center point of the head of the user. The offset point 262 for the Bindu 260 locks to the geometry of the virtual mapped head 250 so that when the virtual mapped head 250 moves, which tracks the head of the user (discussed below) moves or rotates, the center point is also readjusted in real time, while keeping the distance of the offset point 262 for the Bindu 260 constant.

Figure 9:
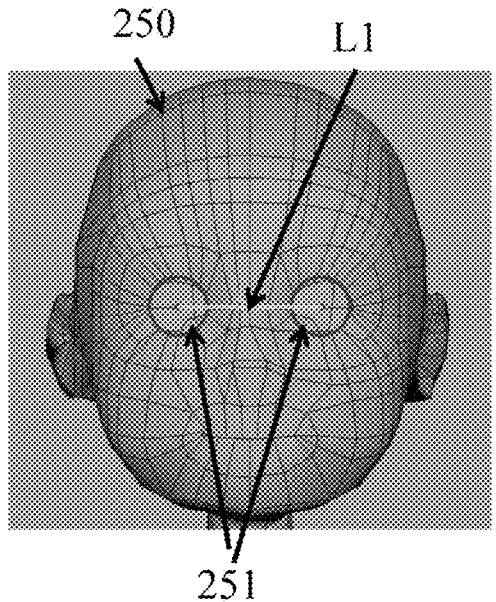
Figure 10:
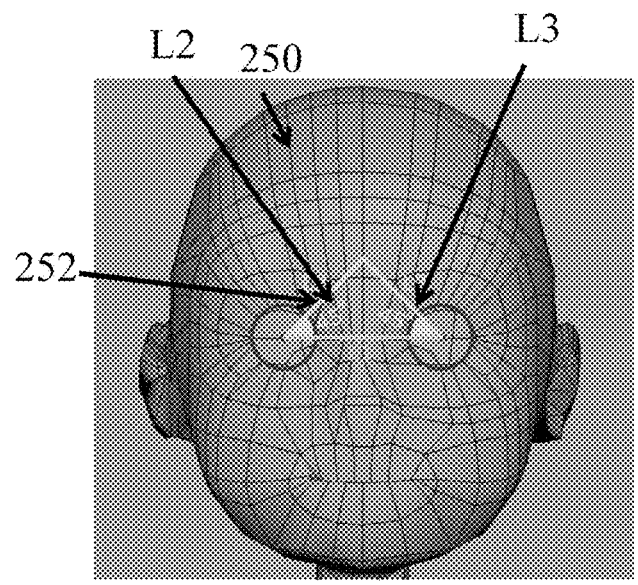

As discussed previously, the Bindu 260 is an imaginary point that is centered by each person to a point at the top center of their head. The exact location can vary from user to user. However, the consistency of stabilizing the Mind's Eye 270 on the same point of perception, the Bindu 260, is essential for the user to learn to read. In an aspect, the Bindu 260 is placed to appear on the display 134 of the mobile device 100 between 3 inches to 5 inches above the center point on the top of the head of the user. This 3 to 5 inches is a representative distance as if the Bindu 260 was actually above the head of the user, and not 3 to 5 inches as measured on the display 134. In an exemplary aspect, the Bindu is placed approximately 3 inches above the center point of the top of the head of user—see FIGS. 13-15. The educational teaching system 10 provides a visual representation of the Bindu 260 in reference to the user on the display 134 (e.g., screen) of the user's device 100. In other words, the Bindu 260 is shown in relation to the position of the field of view of the user by capturing a continuous visual stream of the user's head, including the face, and placing the Bindu 260 on the display 134 in relation to the position of the user's face as captured by the camera 142. The visual representation of the Bindu 260 is placed in the equivalent space on the screen that would represent a location of about 3 to 5 inches, and preferably about 3 inches, above the user's head on the screen as shown in FIGS. 9-10. When the user moves his head, or rolls his head, he can see the Bindu graphic 260 dynamically move in a locked position of a spot a few inches above the top of his head, either the actual visual representation or that of a character or avatar chosen to represent the user (e.g., a character as selected when using the device in a game type setting).

Figure 6:
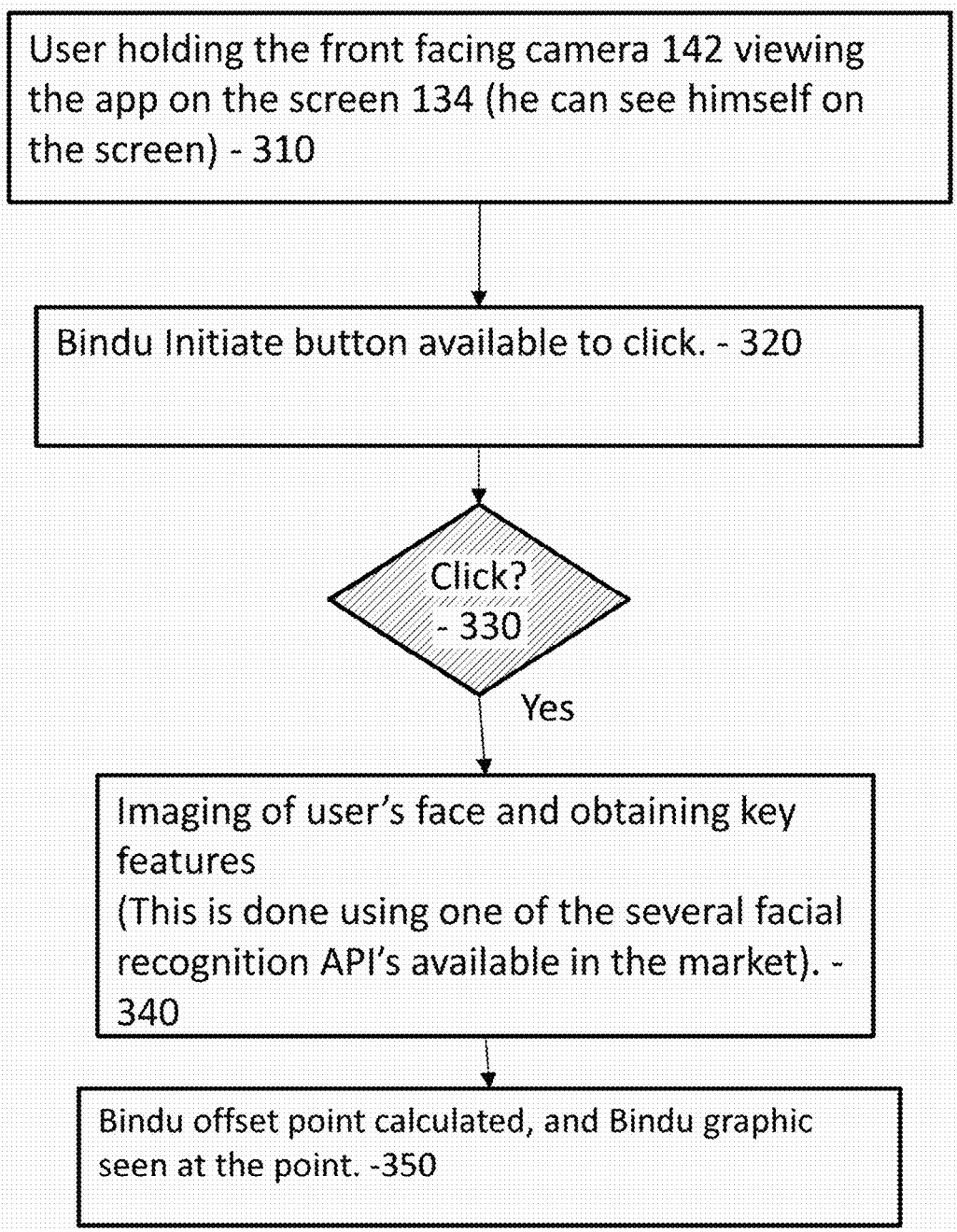
FIG. 6 is a representation of a method performed by the system according to an aspect of the present invention.
Figure 15:
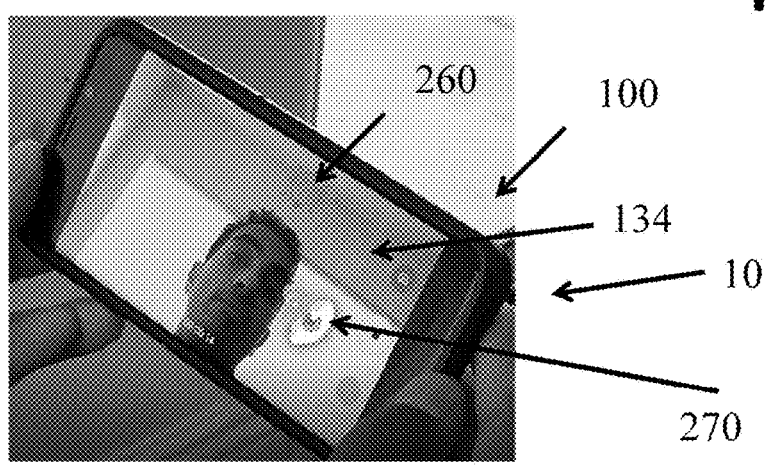
Figure 17C:
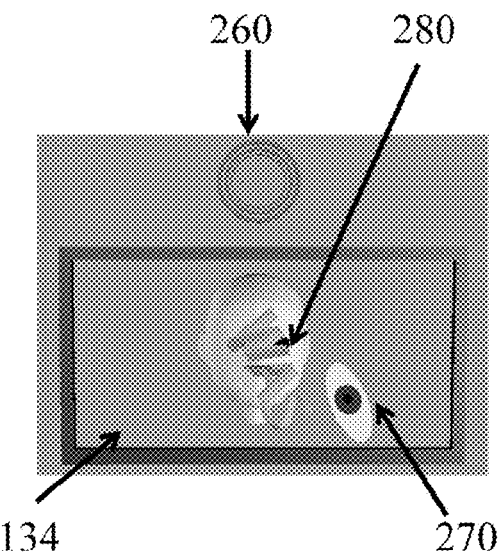
Figure 17D:
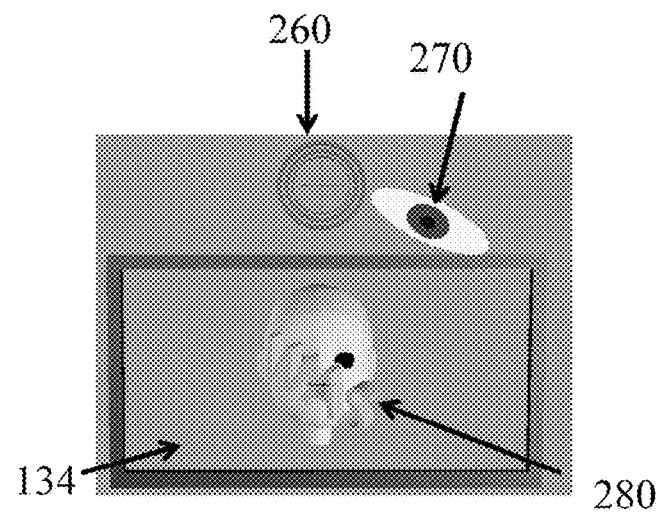
Figure 17E:
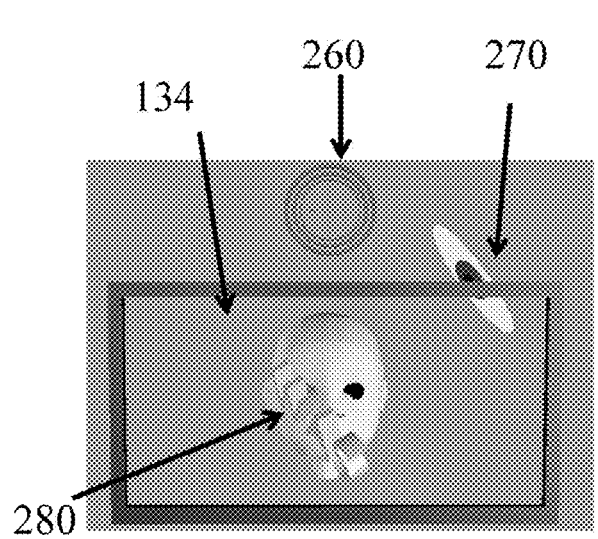
Figure 17F:
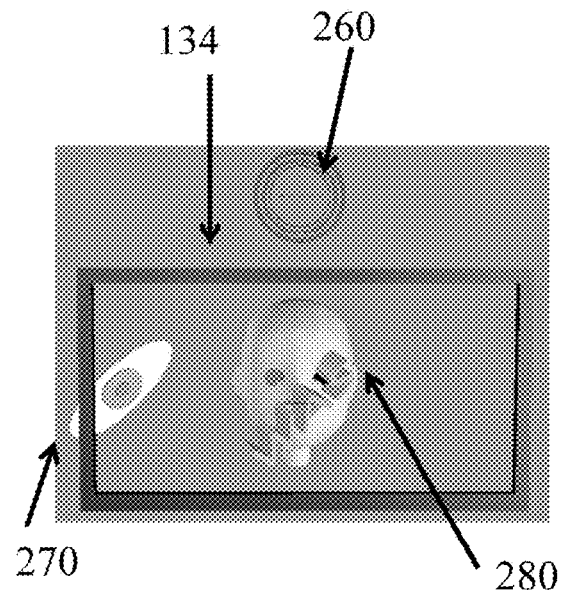

FIG. 6 illustrates a method 300 for mapping a user's head 250 for use with the educational teaching application 200 on the device 100 according to an aspect of the present invention. First, the user holds the front facing camera 142 of the mobile device 100 so he can see his head on the display 134 (step 310). From there, a Bindu initiation button is provided for the user to press (step 320). Once the button is pushed (step 330), imaging of the user's face is done to obtain key features that are used to map the face 250 (step 340). As discussed above, known mapping applications/software 212 can be utilized to do the mapping. Once done, a Bindu offset point 262 is calculated on the user's mapped head 250, and then the Bindu graphic 260 is generated at that offset point 262 (step 350), as shown in FIG. 15. The Bindu point 260 is locked to the mapped head 250, which tracks the head of the user via the camera 142, so that the Bindu 260 moves on the display 134 as the head of the user moves as captured by the camera 142.

Figure 8:
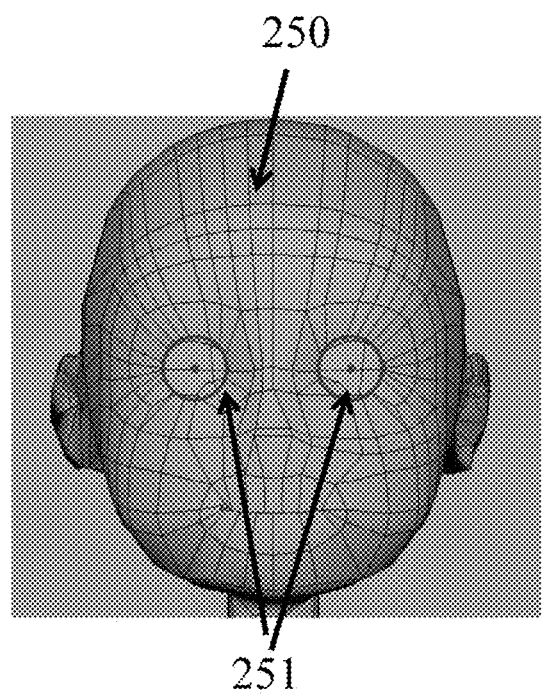
Figure 11:
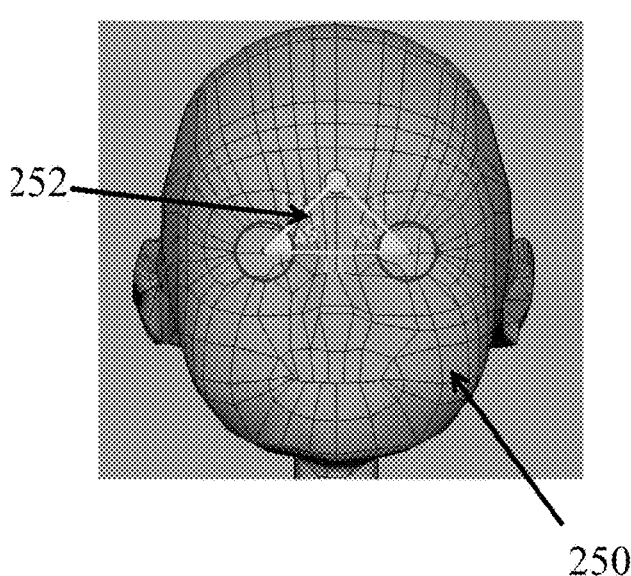
Figure 12:
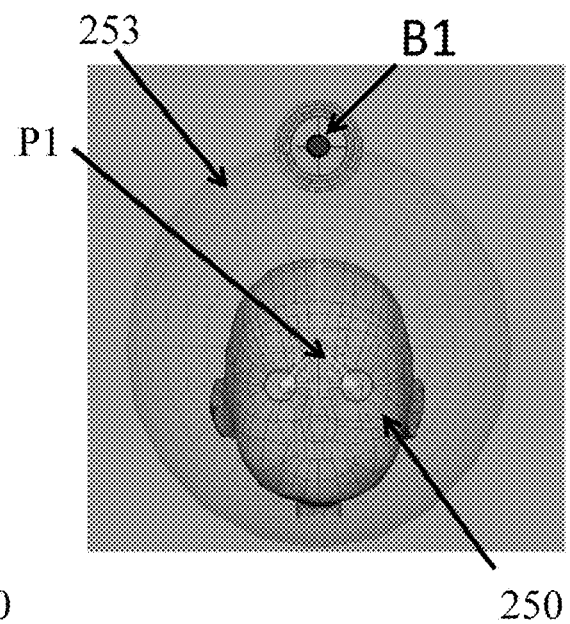
Figure 13:
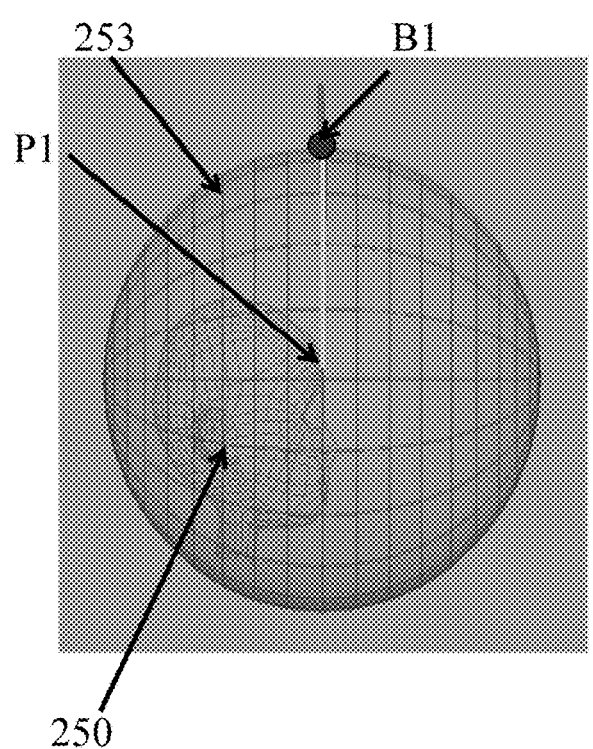

In an aspect, the mapping and AR application 210/212 can build the Bindu based on the center location on the eyes of the user of the mapped head 250, as shown in FIGS. 8-14. The mapping/AR software 210/212 identifies eye sockets 251 and mark the center of each one, as shown in FIG. 8. Upon finding the center of the eye sockets 251, a line (L1) can be drawn between the centers of the eye sockets 251, as shown in FIG. 9. From there, two lines (L2 & L3) are drawn from the center of the eye sockets 251 at 45-degree angles from L1 to form a triangle 252, as shown in FIG. 10. Where the lines L2, L3 meet at the apex of the triangle 252, a point (P1) can be drawn, as shown in FIG. 11. From this point, a 3-dimensional virtual sphere 253 can be created with P1 as the center. At the top of this sphere 253, at a point directly above P1, a point B1 can be created, as shown in FIGS. 12-13. The sphere 253, similar to the mapped head 250, is a virtual object created by the program for measurement and positioning purposes only, and is not seen by the user. In an aspect, the virtual sphere 253 includes a radius that is based upon the distance of L1. In an exemplary aspect, the radius is 2.5 times the length L1.

Figure 14:
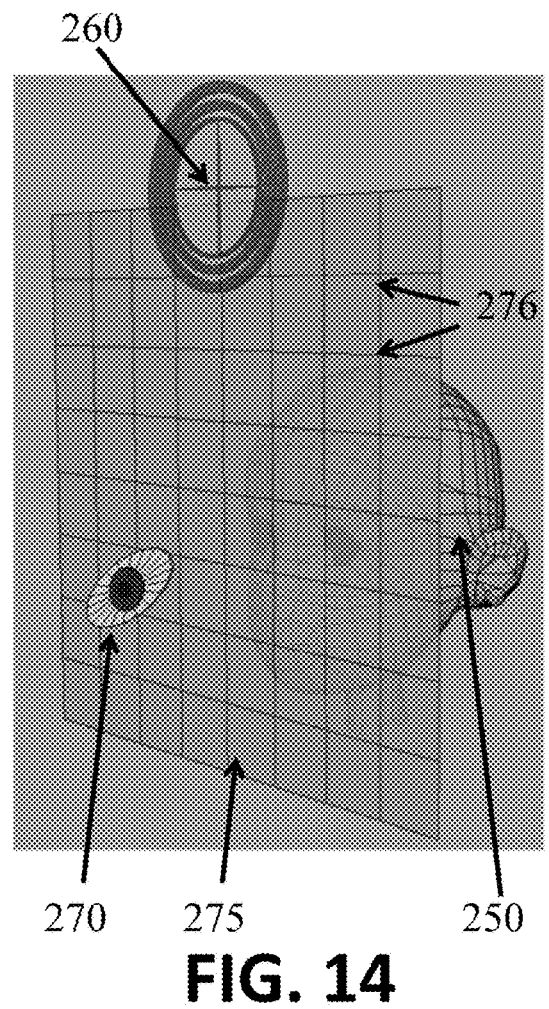

B1 represents the offset point, that is the center point of the top of the head 250 of the user from a front-on view, captured by the camera 142, of the user. At this point B 1, a Bindu graphic 260 can be generated, as shown in FIGS. 14-15. Therefore, as shown FIGS. 14-15, the Bindu 260 is located directly above P1, which is centered on the front of the 3-D learner's mapped head/face 250. Once the head 250 and Bindu 260 have been created, the movement and location of the user's head needs to be tracked. In an aspect, AR software 212 can be utilized to track the orientation and position of the user's head in real-time. In other words, when the user moves or rotates his head in front of the mobile device, the 3-D generated head 250 used for positioning the Bindu 260 and other components moves and rotates simultaneously. In such aspects, the AR software 212 can also be used to offset graphics from the 3-D shape of the player's head, as shown in FIG. 14-15. AR software/applications 212, including, but not limited to ARKit from Apple and ARCore for Android devices, as well as other AR applications known in the art can be used.

The head of the user is mapped in order to monitor the position of the user's head when he interacts with the educational teaching application 200 so that the other graphical elements (i.e., the Bindu 260, Mind's Eye 270, and learning elements 280) utilized by the application 200 can maintain the spatial relationship needed for the teaching aspects, discussed below. In such aspects, the system 10, via the device 100 and educational teaching application 200, the mapping application 210, and the AR application 212, generates a mapping of the head 250 in a spatial environment in order to track and place other components (the Bindu 260, the Mind's Eye 270, and learning elements 280) throughout the display 134 in relationship to the user's head and as displayed on the user device 100. The gyroscope 144*a* and accelerometer 144*b* of the mobile device 100 measures movements such as pitch, roll, and yaw as the user moves and interacts with the mobile device 100. In an aspect, using these inputs, digital representations of the Bindu 260, Mind's Eye 270, and the learning elements 280, such as letters of the alphabet, symbols, numbers, or Abstract Words, and additional graphical elements (e.g., controls) can be incorporated around the displayed image of the user's head captured by the camera 142, through the mapped head 250 and its interaction with the mapping and AR applications 210/212, and then later displayed on the display 134 of the user device 100 as discussed above. In other words, the AR software 212 will project these graphical elements on the display 134 with the image of the user captured by the camera 142, using the mapped head 250 to track and place the other graphical elements on the head.

Once the Bindu has been established, the educational teaching system 10 will establish the Mind's Eye 270. FIGS. 14-32 describe the establishment of the Mind's Eye 270 through various methods. In short, the Mind's Eye 270 is tied to both the Bindu 260 and the learning elements 280 (e.g., letters, Abstract Words, etc.). As discussed above, the learning elements 280 are 3-D representations of 2-D letters and Abstract Words. The Mind's Eye 270 is tied to the spatial orientation of the learning elements 280. The spatial orientation of the learning elements 280 is tied to the spatial orientation of the mobile device 100. Further, the Mind's Eye 270 is tied to the position of the head of the user. When the Mind's Eye 270 is aligned in the correct position on the Bindu 260, and the head of the user, as tracked against the mapped head 250, the learning elements 280 are presented in the correct orientation on the display 134 on the mobile device 100, as shown in FIG. 16. When the Mind's Eye 270 is not placed on the Bindu 260, in the right orientation, the learning elements 280 are in incorrect orientations to the user, as shown in FIGS. 17*a-f*. By doing this, the educational learning system 10 forces the user to concentrate on the Bindu 260 and Mind's Eye 270 relationship to align the learning elements 280 in the correct orientation in a 3D representation, which has been shown to assist users with dyslexic tendencies in learning how to read.

In an aspect, the Mind's Eye 270 is established by generating a virtual grid 275 that is tied to the mapped head 250. Like the mapped head 250, the virtual grid 275 is not displayed to the user. The virtual grid 275 is locked to the geometry of the mapped head 250, as shown in FIG. 14. The Therefore, when the user moves and/or rotates his head, thereby rotating and moving the mapped head 250, the virtual grid 275 also moves and rotates with the head of the user. The virtual grid 275 is a coordinate system used to internally map out the positions of the Mind's Eye 270 along a virtual plane in front of the face of the user. That is, the Mind's Eye 270 is tied to reside within the virtual grid 275, but can be moved to be placed upon the Bindu 260.

Figure 18:
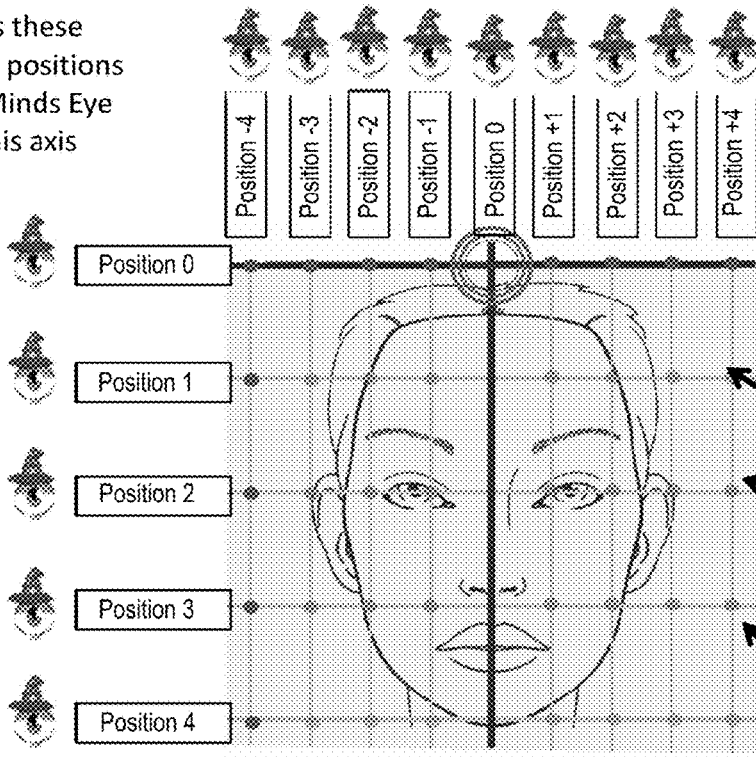
FIG. 18 illustrates a graphical representation of the position a Mind's Eye in a virtual setting according to an aspect of the present invention.
Figure 19A:
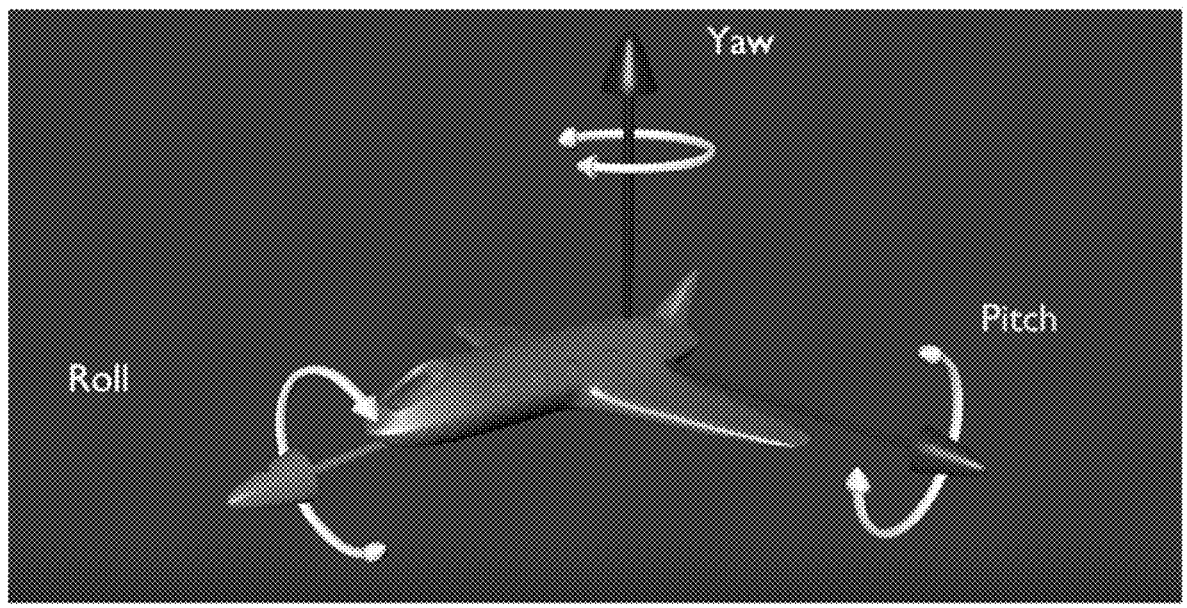
FIG. 19a-b illustrate rotational directions associated with the mobile device of the present invention.
Figure 19B:
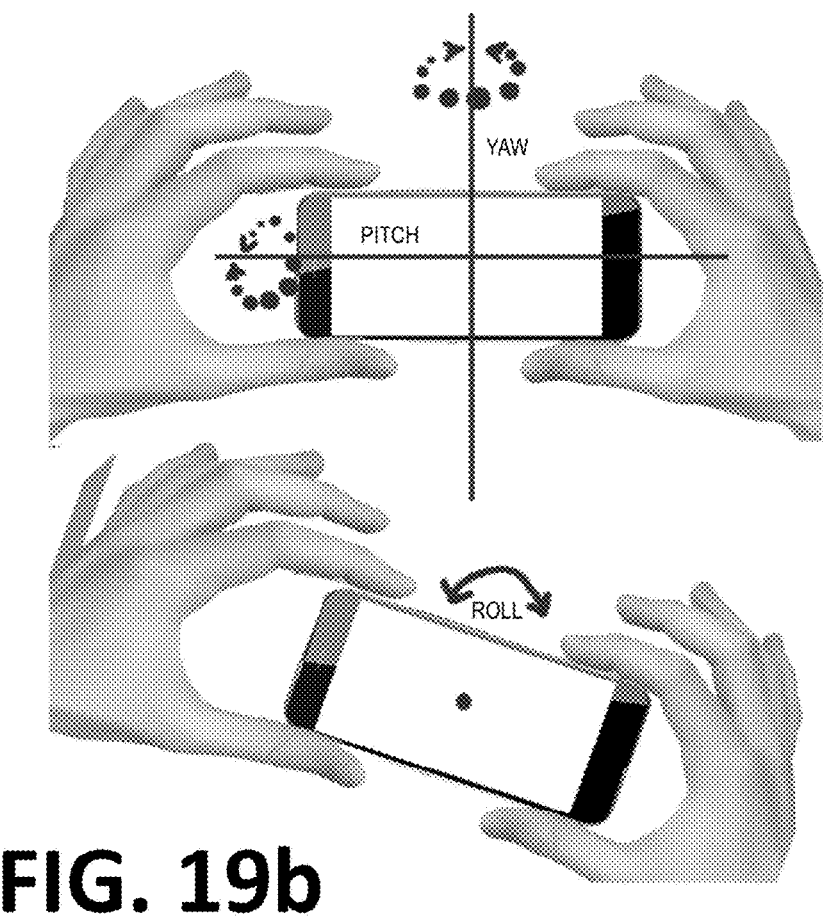
Figure 20:
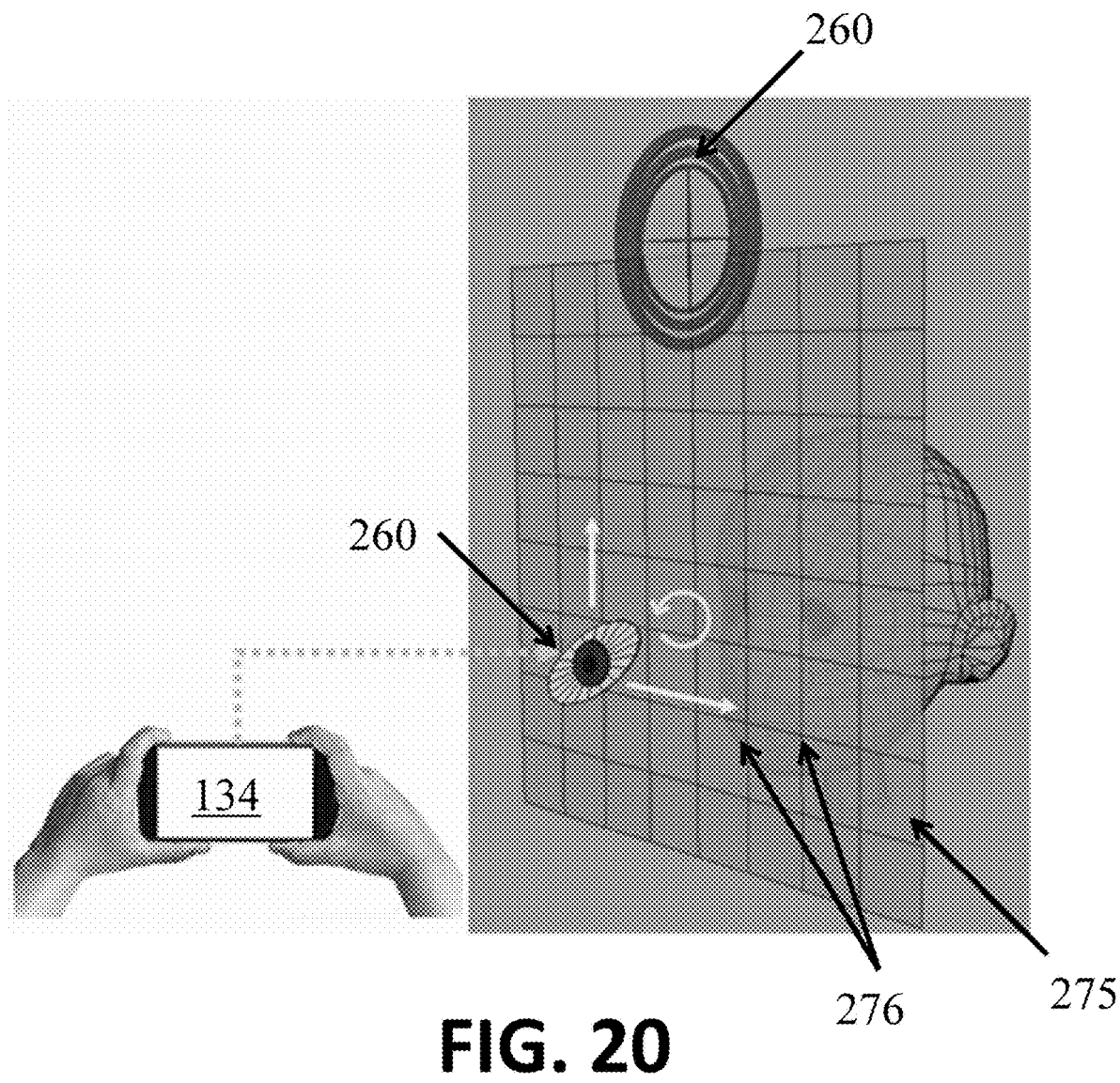
FIG. 20 is a schematic representation of the relationship of the Mind's Eye and its position in relation to a virtual representation of a user's head and the Bindu on a display of a mobile device as the mobile device is moved according to an aspect of the present invention.

The virtual grid 275 represents a pitch axis, a roll axis, and a yaw axis, as shown in FIG. 18. FIG. 18 illustrates these axes in two dimensions, with the yaw direction being tracked rotationally. However, in other aspects, the virtual grid 275 can take a 3D representation. These axes are tied to the position of the mobile device 100, and its pitch, yaw, and roll rotational movements (see FIG. 19*a-b* for illustrations of the movement). As shown in FIG. 20, the more the user Pitches the mobile device 100, the more the Mind's Eye 270 moves up or down on the virtual grid 275. The more the user Yaws the mobile device 100, the more the Mind's Eye moves Left or Right on the virtual grid 275. The more the user Rolls the mobile device 100, the more the Mind's Eye 270 rotates. In addition, these movements are also reflected on the display 134 as shown to the user, without the virtual grid 275 being presented. In an aspect, the Mind's Eye 270 can be generated in random positions on the display 134. In such aspects, the application 200 is configured to capture the spatial position of the mobile device 100, and then base the needed rotational movement of the mobile device 100 from that position. The mobile device 100 does not need to return to one spatial position for the application 200 to initiate the activity.

In an exemplary aspect, the gird 275 has a number of positions along each access that represent a position along the pitch, roll, and yaw axes. As shown, there are five pitch positions (P0-P4), nine roll positions (Y−90 through Y+90), and nine yaw positions (P−4 through P+4). In other embodiments, various numbers of positions can be utilized. The intersections of these axes form points 276. The educational teaching application 200 can randomly generate the Mind's Eye 275 at any given point 276 on the grid 275. When the Mind's Eye 270 is generated on the virtual grid 275, the Mind's Eye 270 will appear on the display 134 of the device 100 in the same position in relation to the face of the user, without the virtual grid being visible. From here, the user will then be tasked with moving the Mind's Eye 270 to align with the Bindu 260, by pitching, yawing, and rolling the mobile device 100.

In addition to the Mind's Eye 270, the educational teaching application 200 can generate a virtual word box 285 to house the learning element 280. In an aspect, like the mapped head 250 and virtual grid 275, the virtual word box 285 is not visible to the user on the display. It is merely a virtual holding spot in which the learning elements 280 are generated to be shown on the display 134. In an aspect, the rotational orientation is fixed to the display 134, with the learning elements 280 spatial positioning rotating in relation to the box 285. In an aspect, the virtual word box 285 can float around the display as the mobile device 100 is rotated, but maintaining the correct orientation. In other aspects, the virtual word box 285 can be tied to the virtual grid 275 and the mapped head 250, with the learning elements 280 free to rotate within the box 285.

In an aspect, each point 276 is tied to rules as to how the learning elements 280 will be initially presented to the user on the display 134, as shown in FIG. 21. For example, when the Mind's eye is generated near at various points, the learning element (here the word "like") will be illustrated in various orientations, as shown in FIG. 21. In addition to the initial position, the point 276 will also be tied to rules that lay out the necessary movement of the mobile device 100 (pitch, roll, and yaw) to move the Mind's Eye 270 to the Bindu 260 in order to present the learning element 280 in its unobstructed and correct orientation and view. In an aspect, the gyroscope 144 is configured to measure the rotational change and position of the mobile device 100, and feed these measurements to the educational teaching application 200.

The position of the Mind's Eye 270 along the virtual grid 275 in turn determines the obstructed view of the learning element 280. In an aspect, the obstructed view is determined by the distortion of the learning element 280 that the user is being taught. Distortion of the learning element 280 means the following: individual letters in a word are flipped vertically, horizontally, and rotated arbitrarily, as shown in FIG. 21. It is these distortions that are to be corrected by repositioning the Mind's Eye 270 on the Bindu 260. The more the Mind's Eye 270 is brought closer towards the Bindu 260, the lesser the distortion. Each Pitch, Roll, and Yaw motion done on the mobile device 100 produces a corresponding sliding motion of the Mind's Eye along the plane of the virtual grid 275, as shown in FIG. 20. This sliding motion would be through various points 276. This correlation between the displacement of the Mind's Eye 275 and the distortion of the learning element 280, is therefore visually represented to the user on the display 134 of the mobile device 100.

In an aspect, the educational teaching application 200 can be configured to track the rotational movement of the mobile device 134 in each direction incrementally, and then adjust the position of the Mind's Eye 270, and the orientation of the learning element 280 accordingly. This can be done by tracking the movement of the Bindu 270 across the points 276 of the virtual grid 275 and applying the rules of that point 276, or by tracking the actual rotational movement and applying the representational difference to the Bindu 270 and learning elements 280.

In another aspect, the rotations of the device 100 is measured and registered in small increments, such as, but not limited to, five degree rotation for Pitch, Yaw, or Roll. When such a change in movement is registered, it is considered to be a successful input by the user. Once an incremental rotation is made (5 degrees), the user brings the device 100 back to the starting point of the rotation. For example, to move the Mind's Eye 270 vertically five points 276, the user Pitches the device 100 in five successive increments, each time bringing the device 100 back to start after an incremental Pitch. In this manner, the user can move the Mind's Eye 270 up to the Bindu 260 on a vertical, horizontal axes and alter the rotation, and match its position and orientation precisely. As such, as the Mind's Eye 270 moves incrementally, the orientation of the learning elements 280 change corresponding. For example, the vertical rotation of the letters of the learning elements move correspondingly in that direction (i.e., rotate). In other aspects, the letters of the learning elements 280 can flip independently and instantaneously (see FIG. 21, moving from all letters in LIKE oriented upside down, to only three letters being upside down with one oriented correctly, to two letters being upside down and two being aligned correctly to one letter aligned upside down and three aligned correctly to all the letters being aligned correctly).

Figure 22:
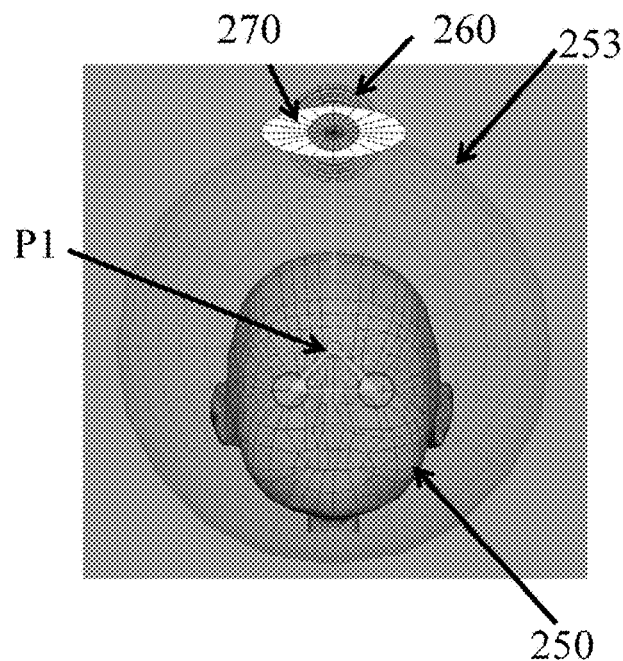
FIGS. 22-24 illustrate how the visual representation of the mind's eye is established according to an aspect of the present invention.
Figure 23:
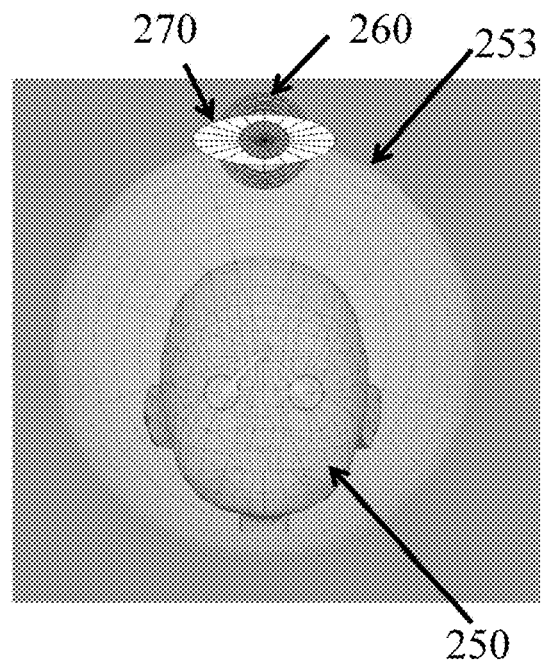
Figure 24:
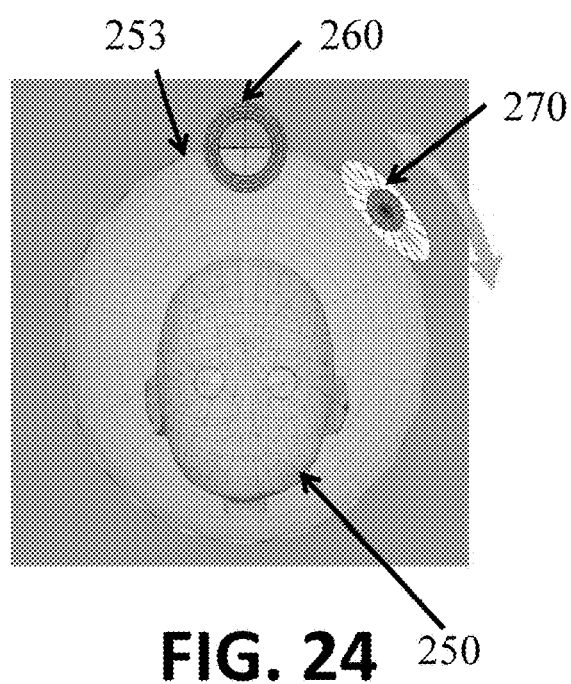

In another aspect, as shown in FIGS. 22-24, the establishment of the Mind's Eye 270 is done by creating the virtual sphere 253 that is has a radial distance from the center point P1 of the 3-D generated head 250 discussed above. Here, the Mind's Eye 270 can reside on the virtual sphere 253. In an aspect, the radial distance of the Mind's Eye 270 is equal to that of the radial distance of that of the Bindu 260 from the center point of the 3-D head 250. In addition, the Mind's Eye 270 can be configured to be positioned directly on top of the Bindu 260. However, while the radial distance is fixed for the Mind's Eye 270, the Mind's Eye 270 is not locked in a static point above the center of the head 250 of the user. In other words, the Mind's Eye 270 is fixed at a static distance from the center point of the 3-D head 250, but can move around the head on the vertical sphere 253 via rotating the mobile device 100 in the pitch, yaw, and roll directions, as shown in FIG. 24.

Figure 25:
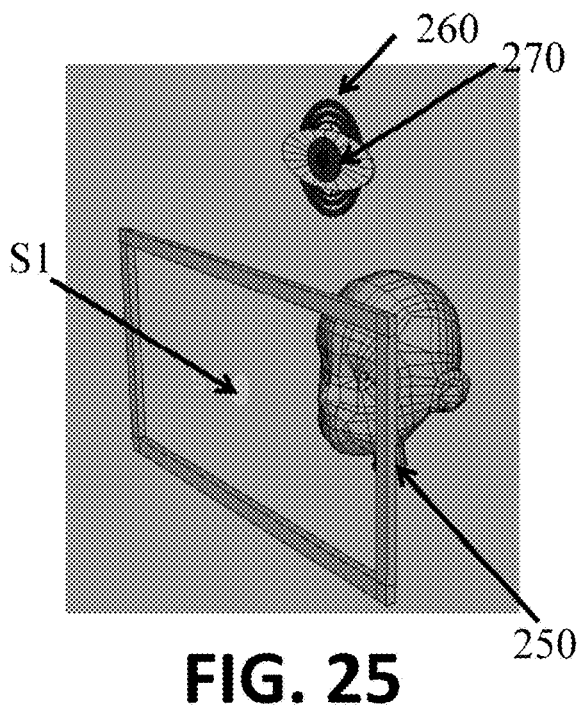
FIGS. 25-28 illustrate how a virtual word box is established in relation to the Mind's Eye and Bindu/focusing point according to an aspect of the present invention.
Figure 26:
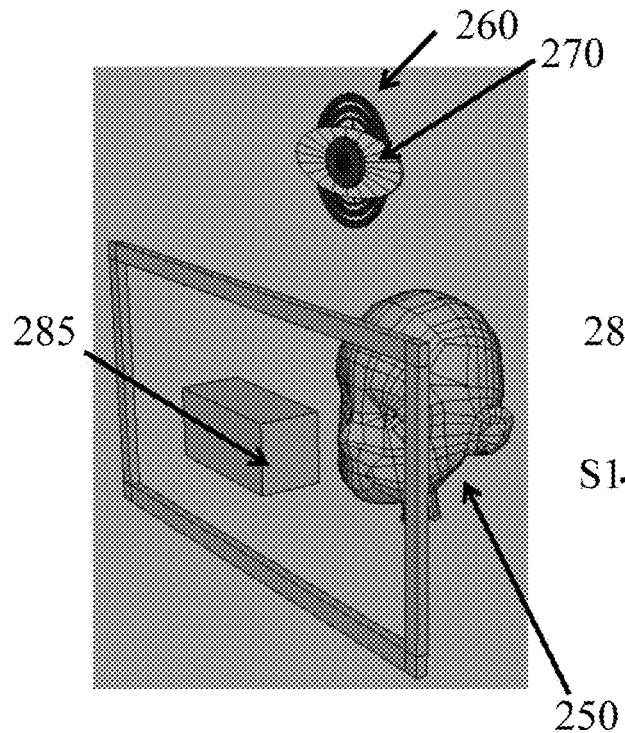
Figure 27:
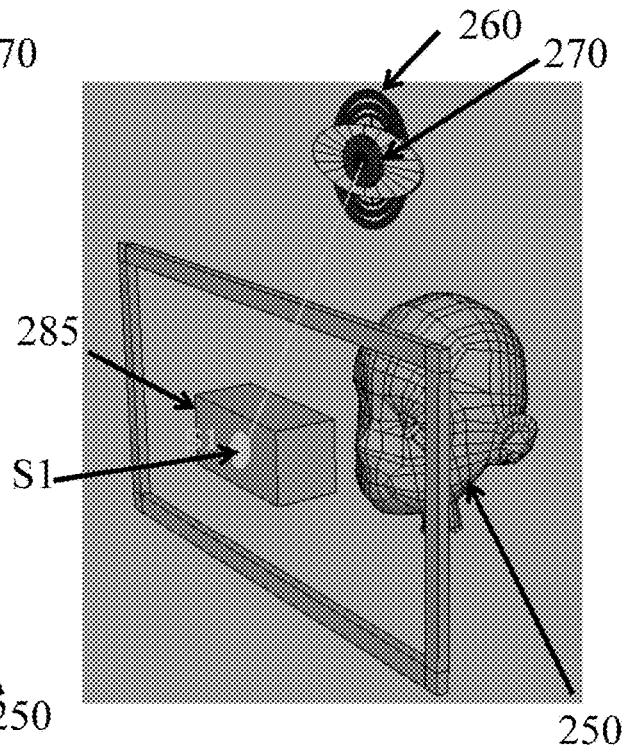
Figure 28:
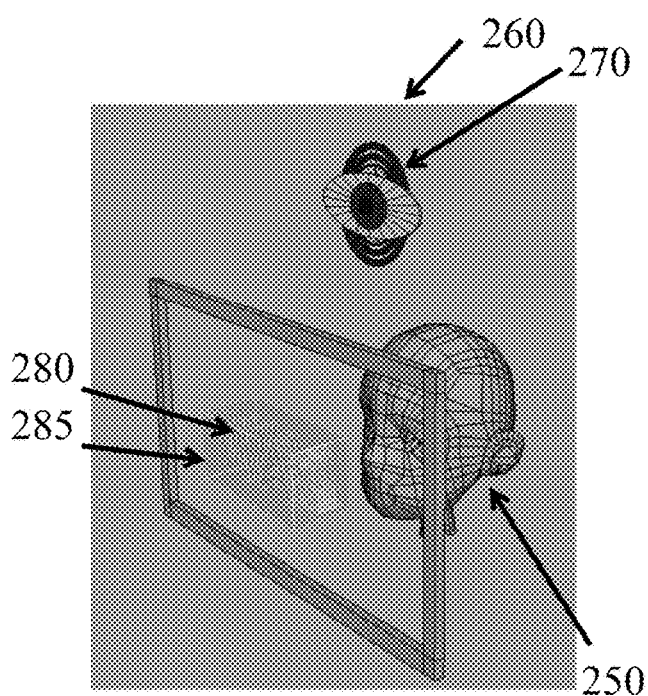
Figure 30:
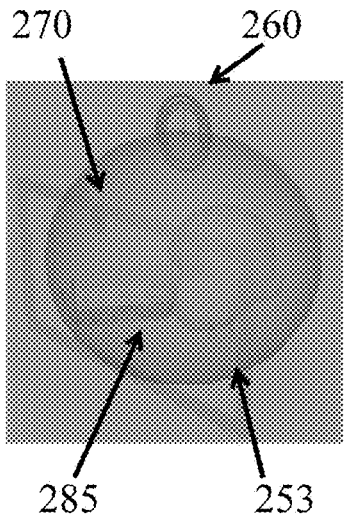
FIGS. 29-31 illustrate how the virtual box, mind's eye, and Bindu/focusing point are controlled by the pitch, roll, and yaw of a mobile device according to an aspect of the present invention.
Figure 29:
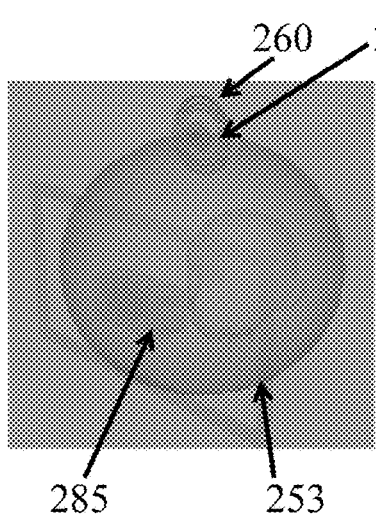
Figure 31:
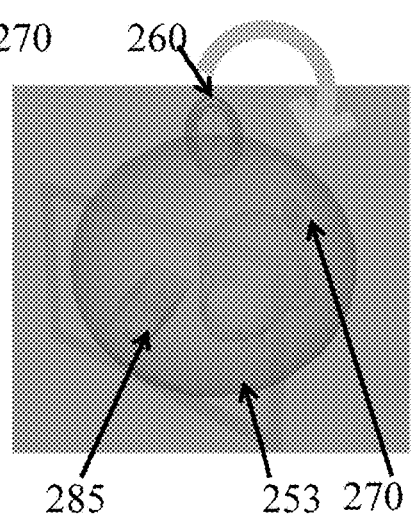
Figure 32:
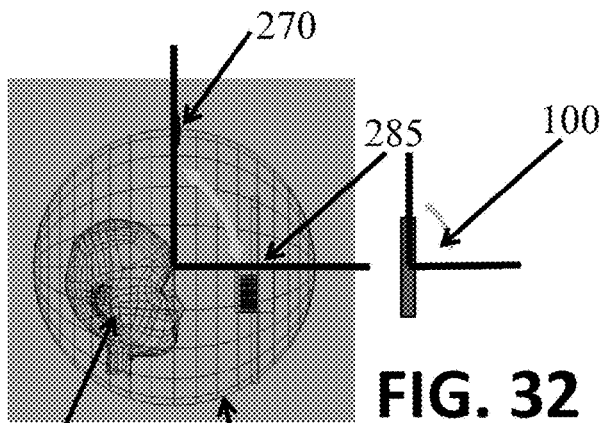
FIGS. 32-34 illustrate how the pitch, yaw, and roll angles of the virtual sphere are locked to the pitch, yaw, and roll movement of the mobile device according to an aspect.
Figure 33:
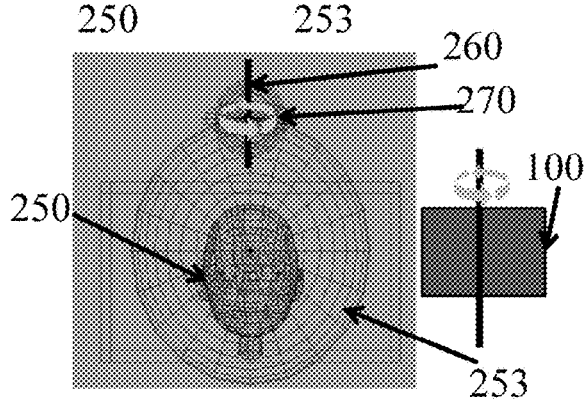
Figure 34:
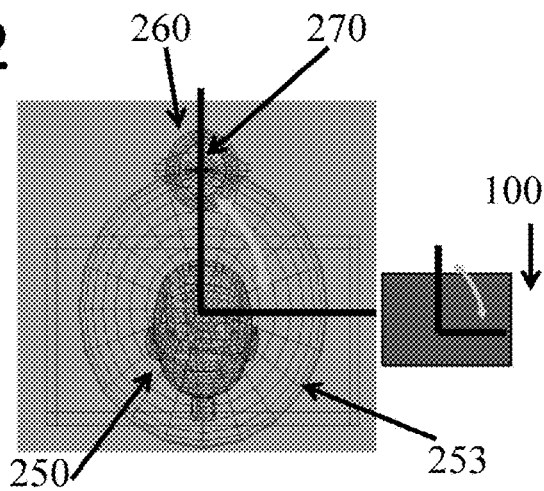

Once the position of the Mind's Eye 270 has been established on the virtual sphere 253, in relation to the Bindu 260, a virtual word box 285 can be established, as shown in FIGS. 25-28. As shown in FIG. 25, a center point 51 of the screen is generated. From here, a virtual word box 285 is established on the center point 51, as shown in FIG. 26. The orientation of the virtual box 285 is aligned and locked with the orientation of the Mind's Eye 270, as shown in FIG. 27. To recap this arrangement: the rotations of the virtual box are driven by the rotations of the Mind's Eye 270, which is in turn driven by the rotations of the virtual sphere 253. Once the virtual box is locked to the orientation of the Mind's Eye 270, a learning element 280 (e.g., a 3-D word—WAS as illustrated) can be generated and placed in the center of the virtual box 285, as shown in FIG. 28. This learning element 280 is placed exactly in the middle of the virtual box 285. Once placed, the orientation of the 3-D word is locked to the box 285. The box 285 and the learning elements 280 are aligned so that when the Mind's Eye 270 is correctly aligned with the Bindu 260, in the X, Y, and Z directions, then the learning element 280 is fully presented to the user in the correct view, as shown in FIG. 29. So now when there is any displacement of the Mind's Eye 270 from its position on the Bindu 260, there is going to be a corresponding displacement on the learning element 280. This shows the user that there is some correlation between the distortion of the learning element 280, and the displacement of the Mind's Eye 270. The Pitch, Roll, Yaw angle of the box is locked to the corresponding angles of the virtual sphere 253 as shown in FIG. 30-31, so that when the virtual sphere 253 rolls or pitches, this drives the virtual box to do similar movements. As shown in FIG. 30, if the device 100 yaws 80 degrees left (rotates around the z-axis) from the position shown in FIG. 29. FIG. 31 illustrates the yaw of the device 100 80 degrees right from the original position. The two objects are therefore locked. From here, the pitch and the Roll of the mobile device 100 are tied to the virtual sphere 253, as shown in FIG. 32 and FIG. 34. The Yaw angle of the mobile device, is locked to the Yaw angle of the Mind's Eye 270, as shown in FIG. 33.

In an aspect, the educational teaching application 200 can be configured to operate only when the user is ready to participate. For example, the application 200 can be configured to operate only when the user has positioned the mobile device 100 so that his face is fully visible by the front-facing camera 142, held at an adequate distance from his face (e.g., at arm's length, so between 1-3 ft.), and/or is looking directly at the display 134. If the camera becomes blocked (e.g., a finger on the lens) or the phone is dropped, placed down, etc., the educational learning application 200 freezes all functionality and locations of the Mind's Eye 270 and learning elements 280 until the application can confirm that the user has positioned the camera 142 in the right position with an unobstructed view. In such aspects, if the application 200 has frozen the application, the application can provide a prompt to the user via the display 134 warning the user to hold the device in the correct position, and look at the screen. Once the application 200 has confirmed compliance with the instruction, the application 200 can proceed with the various activity automatically, or have the user confirm via providing a specific response or input.

Figure 35:
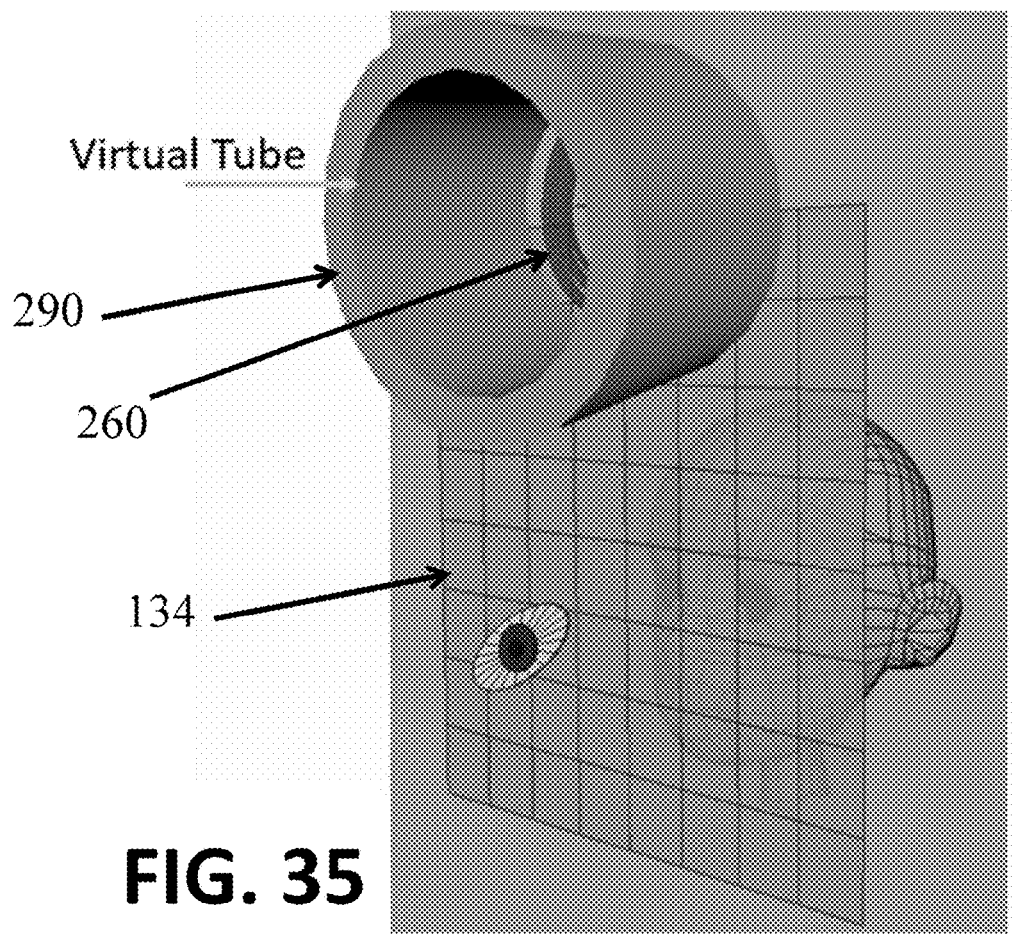
FIGS. 35-36 are schematic representations of a viewing tube according to an aspect of the present invention.
Figure 36:
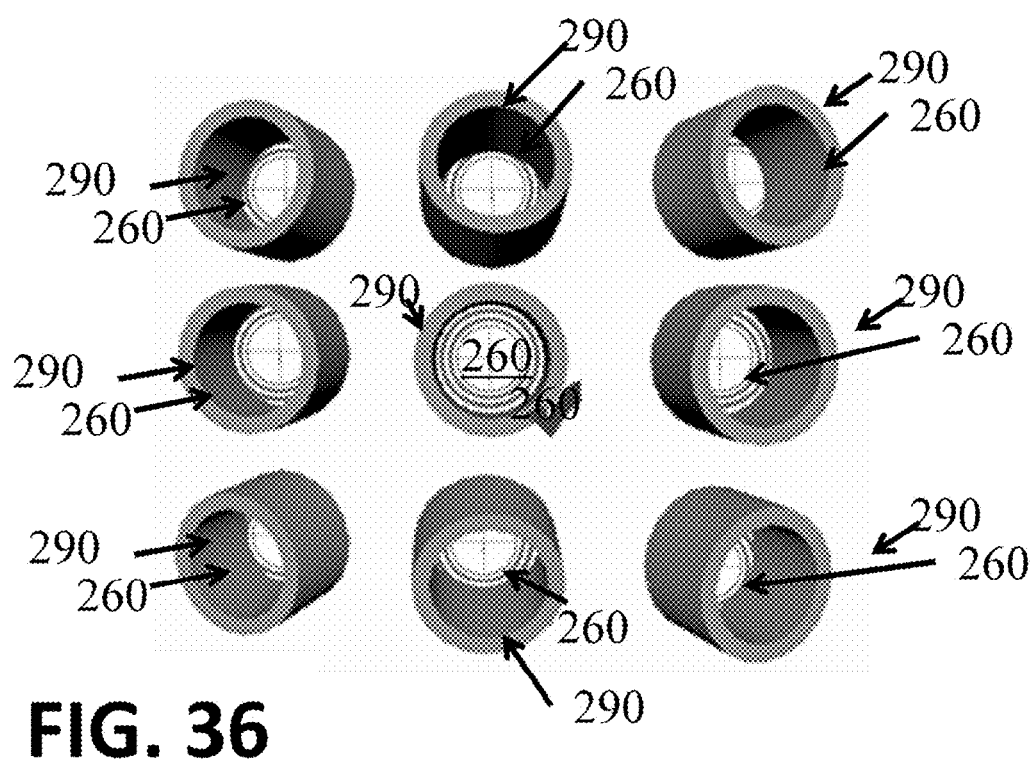

FIGS. 35-36 illustrate how the educational teaching application 200 requires the user to look directly at the Bindu 260 as a condition to initiate the activity. The device 100 checks for a successful gazing by using eye-tracking algorithms, which are available in the market. The device 100, via the camera 142 and other sensors 144, measures the looking angle of the user by the aid of a virtual tube 290 placed over the Bindu 260 as shown in FIG. 35. The virtual tube 290 is not visible to the user, and is used only to test for a direct line of sight. The direct line of sight is registered as described: If the circle representing the back of the tube 290 can be detected by the device 100, the application 200 registers that the user is looking directly through the tube 290 at the Bindu 260 (middle example out of the nine shown, where the full Bindu 260 is visible within the virtual tube 290), as shown in FIG. 36.

Once the Bindu 260 and Mind's Eye 270 have been established, as well as the Mind's Eye 270 reference method (e.g., via the virtual grid 275 or the virtual sphere 253), the system 10 can then start to teach the user to learn to imagine his Mind's Eye 270 on the Bindu 260, and actively reposition his Mind's Eye 270, on to the Bindu 260, where it should belong at all times to emphasize how to correctly align the learning elements 280.

Figure 37:
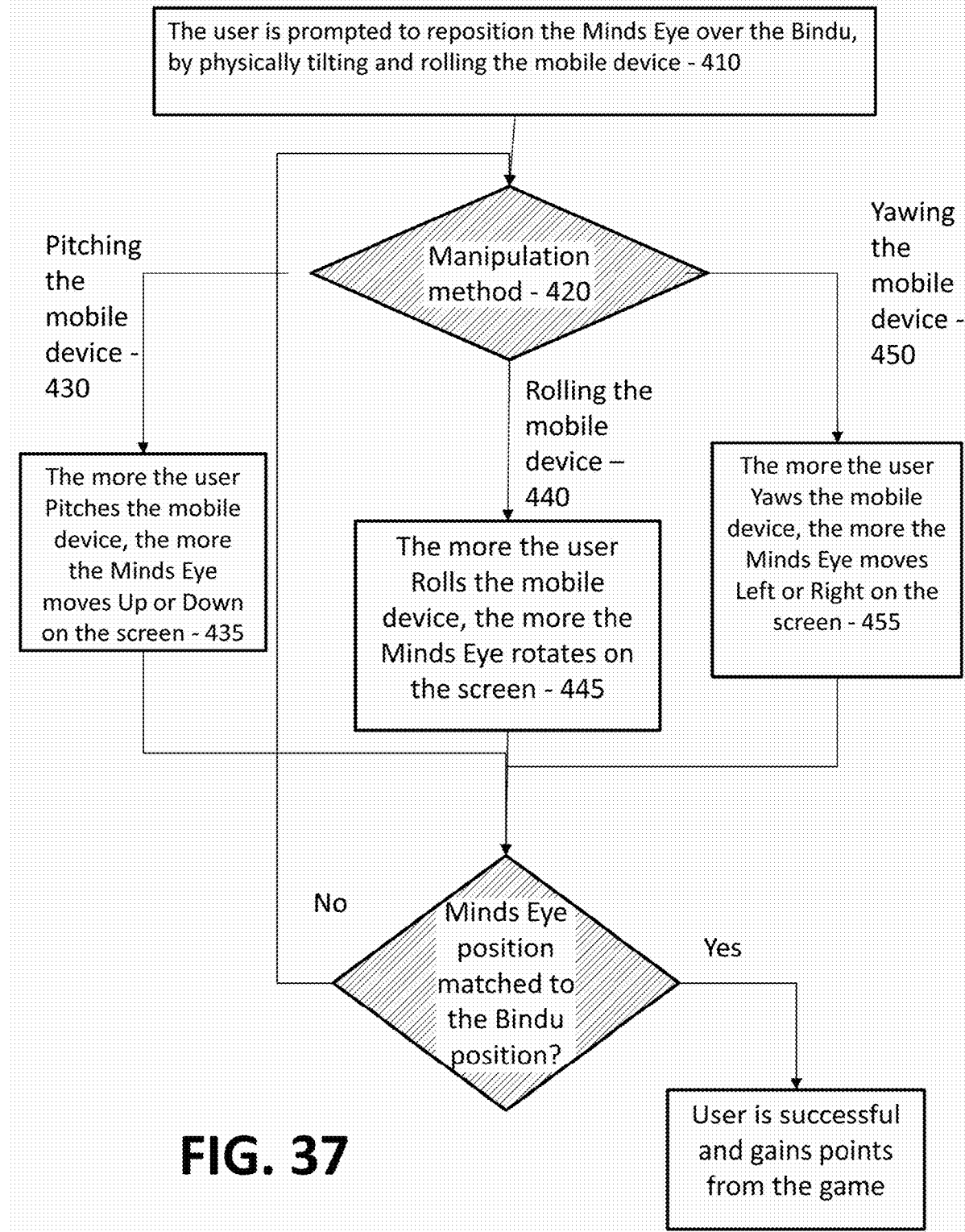
FIG. 37 illustrates a flow chart of a method according to an aspect of the present invention.

The process of removing the distortion of the word is therefore gamified by letting the learner actively control and reposition his personal Mind's Eye. Once the Bindu and Mind's Eye are correctly aligned, the 3-D representation of the word is presented correctly, with a non-distorted view. Until the Mind's Eye and Bindu are aligned correctly, the 3-D representation of the word is presented in various distorted fashions. Once aligned correctly, the system can alert the user, and provide some kind of reward, or notification that it has been aligned correctly, as shown by the method illustrated in FIG. 37. The user is prompted to reposition the Mind's Eye 270 over the Bindu 260 by physically titling and rolling the mobile device 100 (step 410). The educational teaching application 200 measures the manipulation method (step 420) to determine the type of manipulation. If pitching is detected (step 430), the more the user pitches, the more the Mind's Eye moves up or down the screen (step 435). If Rolling is detected (step 440), the more the user rolls the device, the more the Mind's Eye 270 rotates on the screen (step 445). If yawing is detected (450), the Mind's Eye 270 is then moved left or right on the screen dependent on the amount of rolling of the device 100 (step 455). The application 200 will then continue to monitor the Mind's Eye 270 to see if it's position matches the position of the Bindu 260 (step 460). If the positions do no match (step 470), the application continues to monitor for manipulation of the device (step 420). If the positions match (480), then the user is successful, and can be notified as such, as well as rewarded. Further, as the Mind's Eye 270 is moved according to the method above, the learning elements 280 are moved from a distorted view to the unobstructed view via the means discussed above. By presenting the learning elements 280 in a distorted fashion, the dyslexic's experience is shown, allowing them to correctly align a 3-D representation of the learning element 280 in the correct position. With the word in the correct position, the user then views the word correctly, and can then hear it and learn its meaning.

The educational teaching system 10 can be utilized to teach the user numerous things in numerous ways, including, but not limited to, the alphabet, reading comprehension, all studies of higher education, and the like. In addition, the system can be utilized with any language. In each area of teaching, the Bindu and Mind's Eye functionality can be utilized. In an aspect, the system can be utilized through a game application. As the user imagines his Mind's Eye on his Bindu, he begins to always place his Mind's Eye on his Bindu when asked to "go to his Bindu". This action is called "Go to your Bindu." The user is asked to "go to his Bindu" every time he starts a lesson, takes a quiz, or makes a mistake. The system 10 generates a word in the virtual box, and prompts the user to imagine his mind's eye over his Bindu as he views the word.

Figure 38:
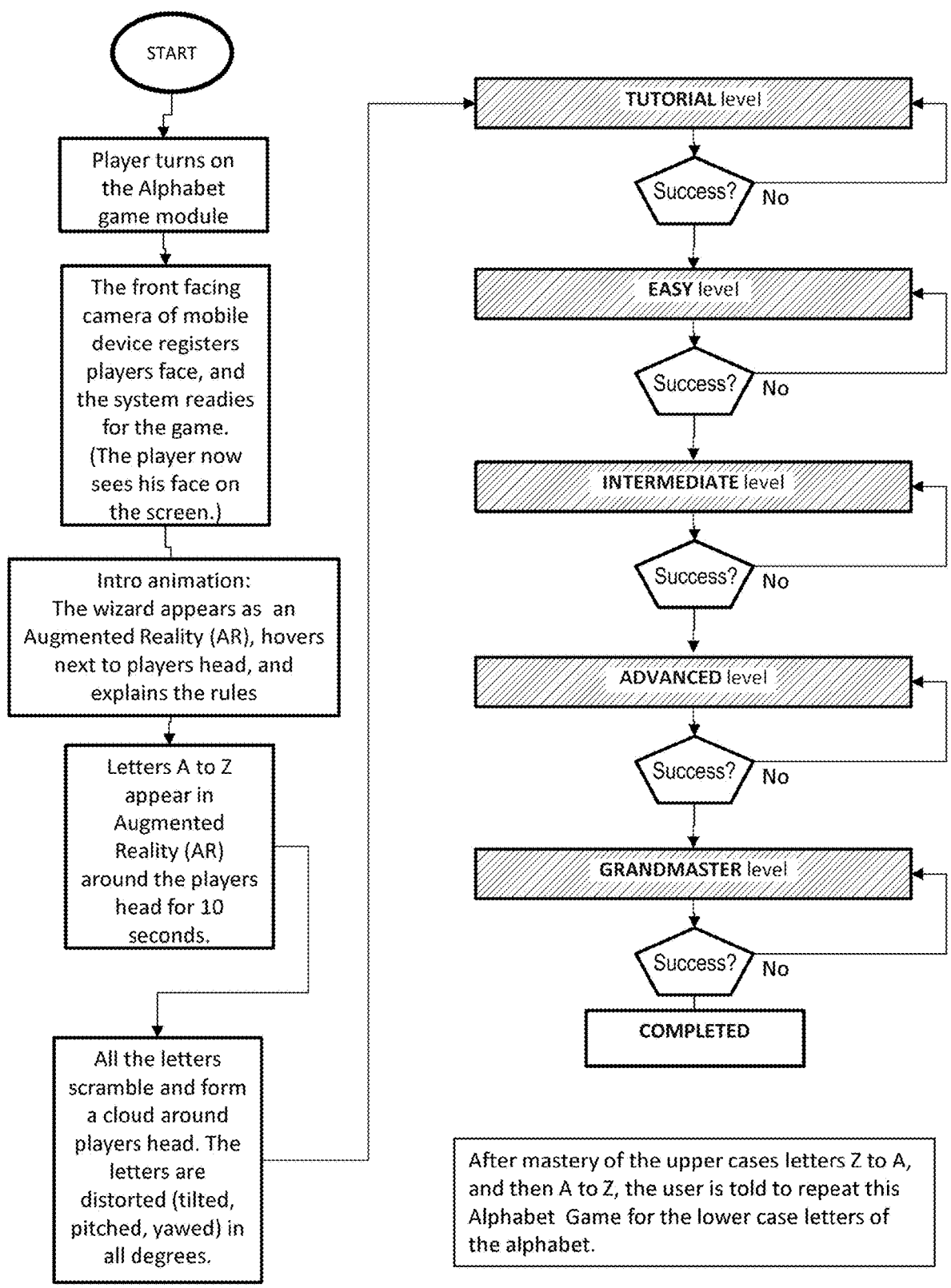
FIGS. 38-43 illustrate methods for advancing and playing a game related to the alphabet utilizing the Bindu/focusing point and mind's eye alignment functionality according to an aspect of the present invention.

For example, the educational teaching system 10 can teach a user the letters of the alphabet through an alphabet teaching module known as the Alphabet Mastery Game™, as shown in FIGS. 38-43. In an aspect, the alphabet teaching module teaches accurate recognition of the shape and orientation of each letter of the alphabet—so a "b" looks like a "b" and not like a "d," "p," or a "q." As shown in FIG. 38, the user can select the alphabet teaching module. The system can then set up and review the Bindu/Mind's Eye relationship, as discussed above. Once that is done, the game rules can be introduced. At first, the alphabet A to Z appears for a short while, and the user reads each letter. The ordered letters disappear into a maze of disoriented and disordered letters flying around. The player will have a given amount of time to align a given number of letters from Z to A order and/or from A to Z order. The user would select a letter by touching it on the display 134, which would highlight the letter. Aligning would be done by manipulating the mobile device—pitch, roll, yaw, and tapping. In an aspect, the alphabet teaching module can be sent up so that the user is only allowed to put the letters in A to Z order once he has mastered how the put the letters in Z to A order, or vice versa. In another aspect, the alphabet teaching module can present the letters in upper case form only, lower case form only, a mixture of both, and can require mastery of arranging the letters in upper and lower case before allowing progress to sets of letters or other games. The game moves through ordering increasingly larger segments of the alphabet from Z to A. The letters will be presented in various disoriented positions (rolled, pitched, yawed in all degrees) on the screen. From here, the system will require the user to align them in the proper order and their proper orientation.

Figure 39:
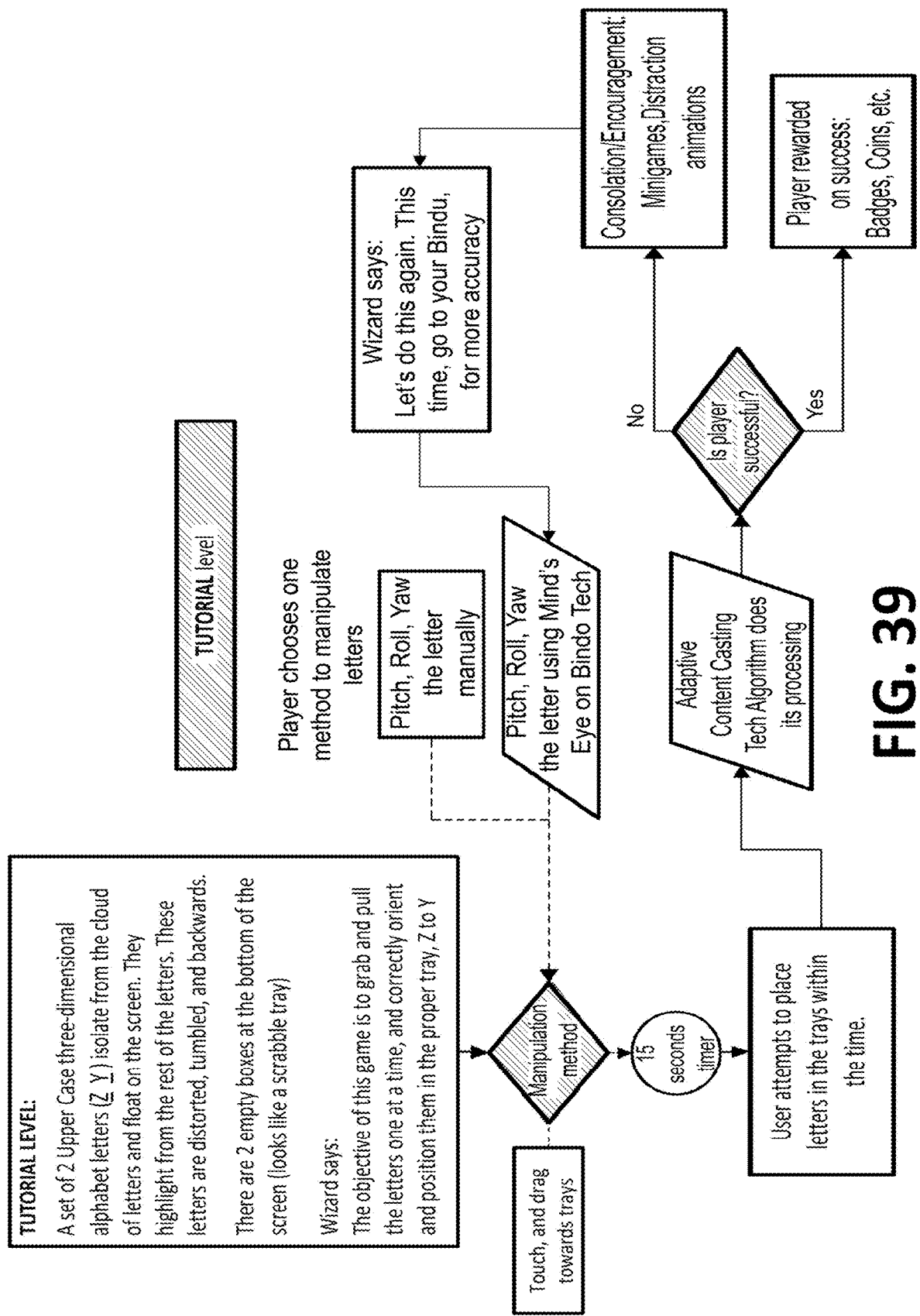
Figure 40:
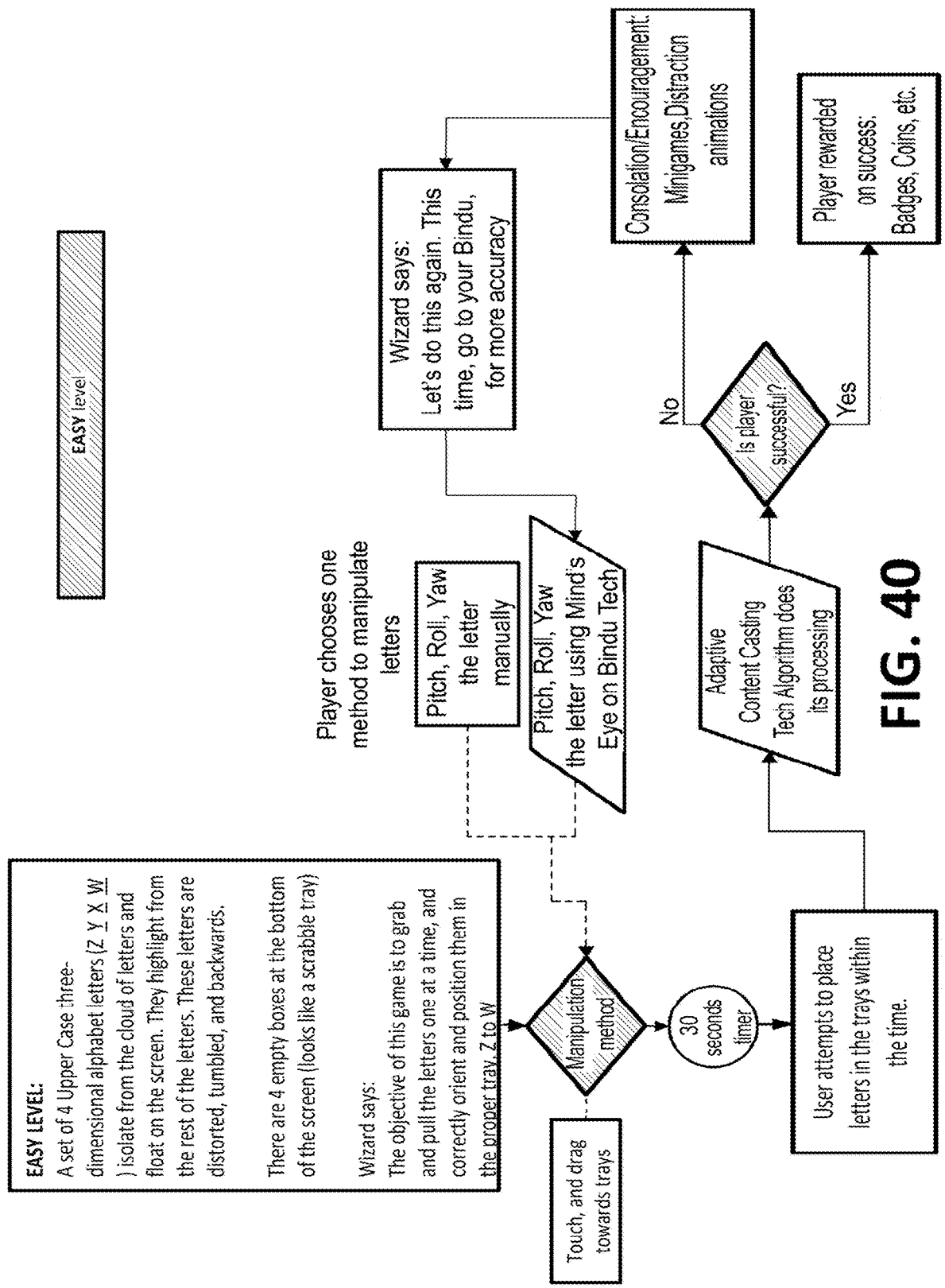
Figure 41:
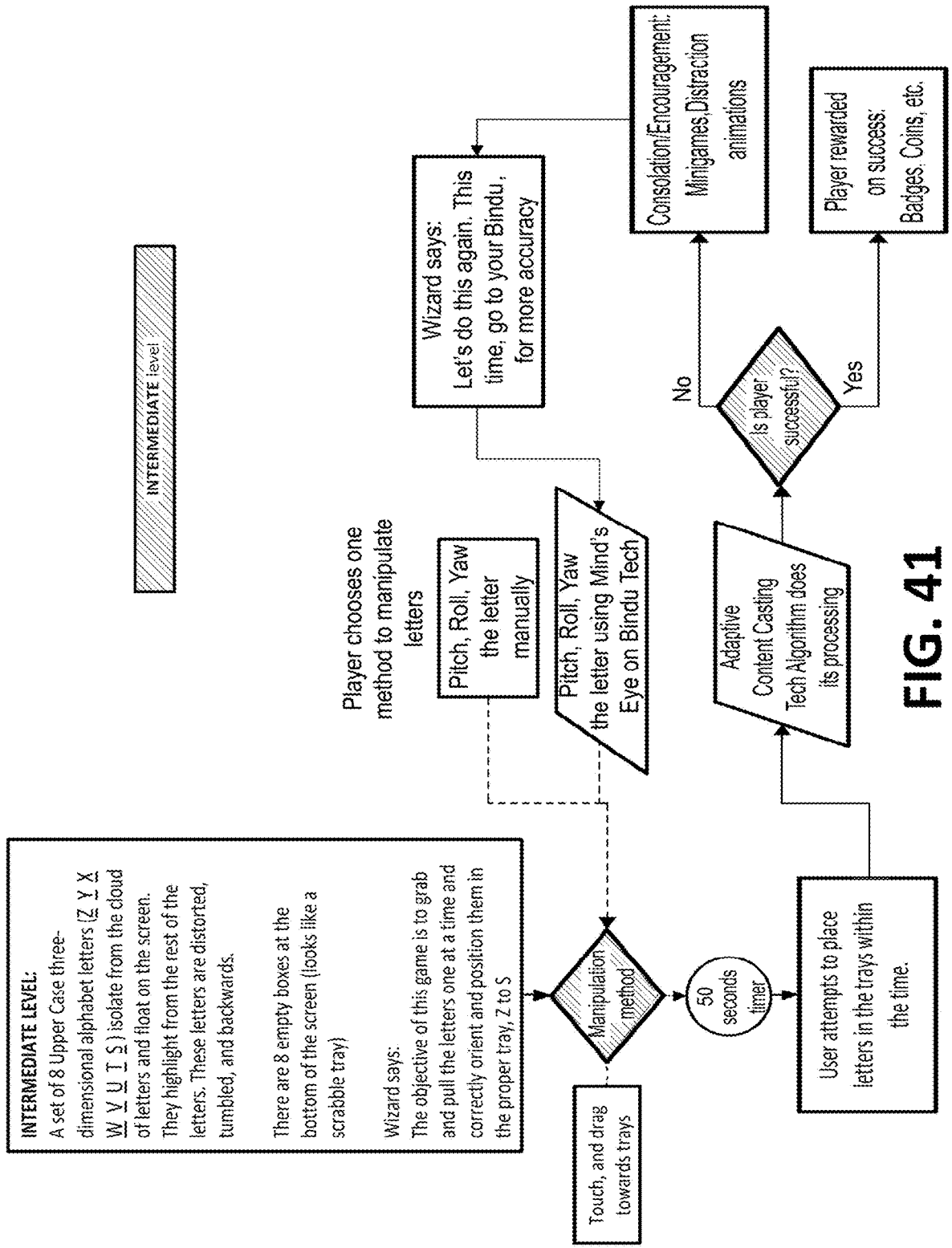
Figure 42:
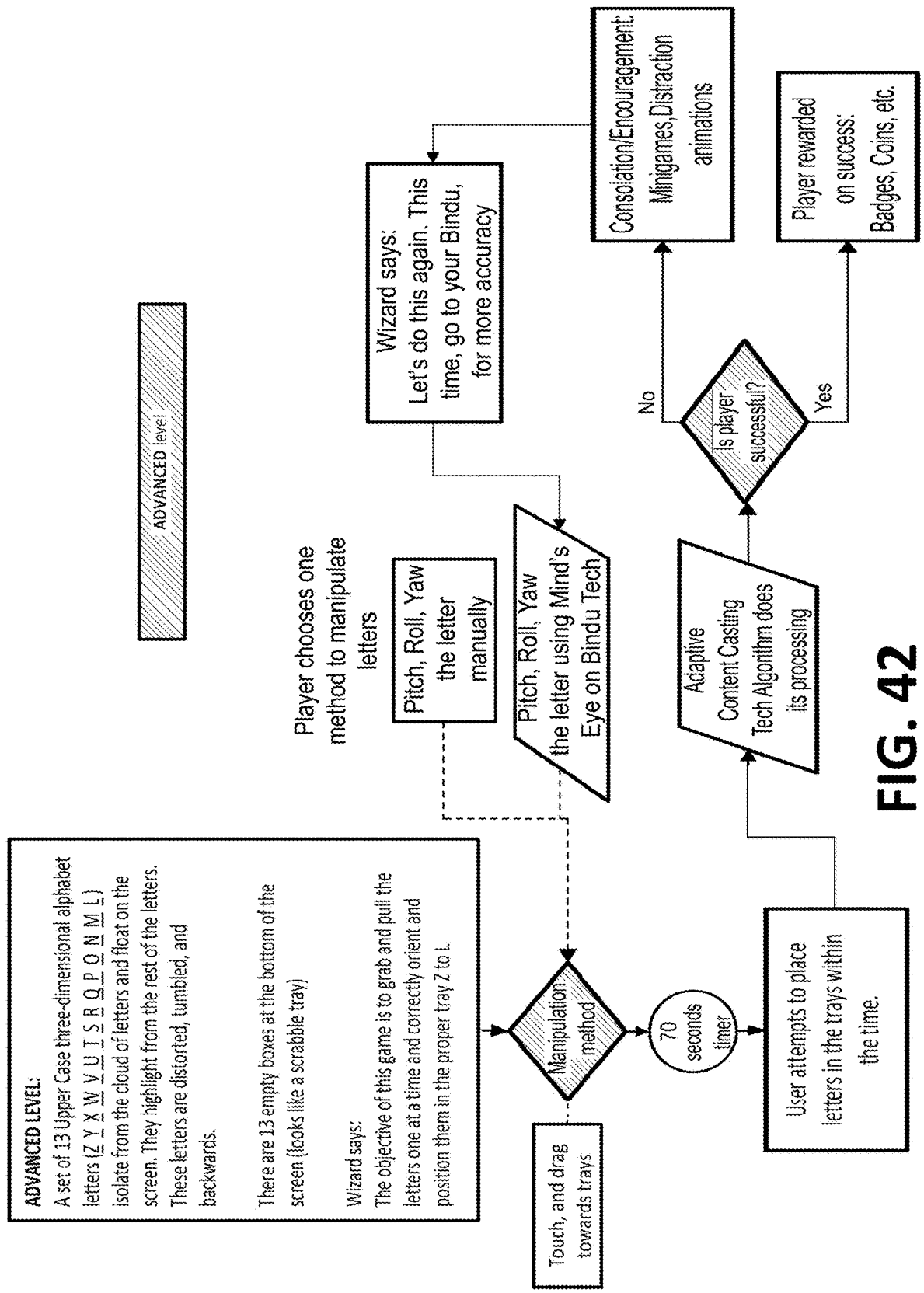
Figure 43:
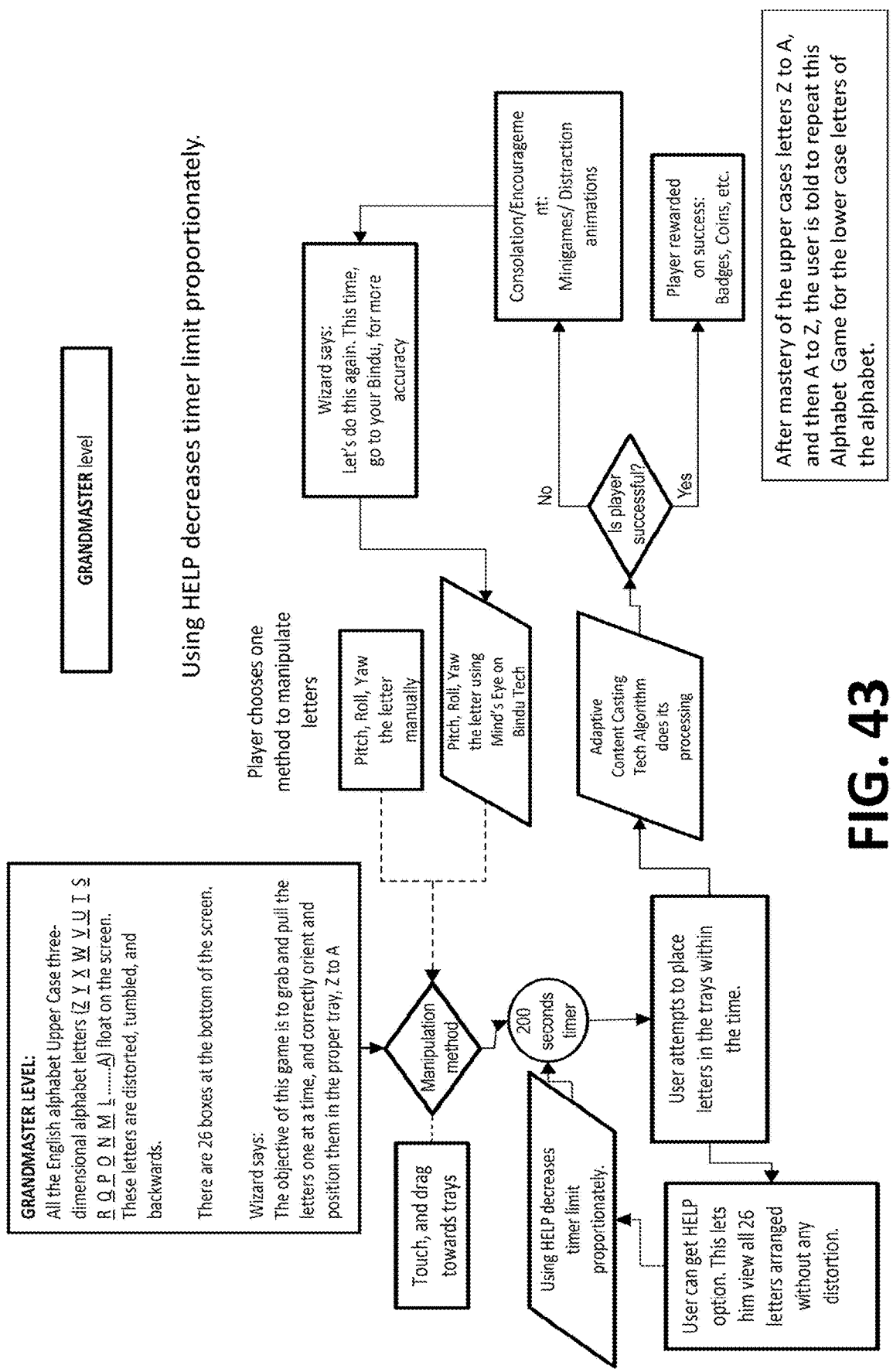

In an aspect, a tray with empty places for the corresponding number of letters will appear. The user is given an option to choose one of two ways to reposition the distorted letters into the tray in the proper orientation. Method 1 uses a normal manual method of touching the letter, and dragging it from the cloud, to the tray; and pitching, rolling, and yawing the letter into its proper orientation by swiping on the letter with his finger. This swiping method is normally used in games to manipulate objects on mobile screens in typical mobile games. Method 2 involves the Bindu method, as discussed above. In such methods, the user repositions the Mind's Eye over the Bindu, and in the process re-orienting the letter to its proper, non-distorted view. For example, as shown in FIG. 39 the letters Y and Z are shown, and need to be put in Z to A order. The positioning and orienting should be done within a given time (e.g., 15 seconds). If the user is successful the user can advance to a tougher stage, with more letters and more time (see FIGS. 40-43) If not, the game is repeated at that level until the user is successful within the given time frame. In an aspect, there can be various time frames for each level. For example, a user can have: 15 seconds for positioning two letters (ZY) in two places/slots (FIG. 39); 30 seconds for positioning four letters (ZYXW) with four places/slots (FIG. 40); 50 seconds for eight letters (ZIWYKIT) with eight places/slots (FIG. 41); 70 seconds for thirteen letters for thirteen places/slots (FIG. 42); and 200 seconds to position all 26 letters correctly in 26 places/slots (FIG. 43).

In an aspect, the educational teaching system can also utilize an educational adventure game module that has several mini-games or lessons. For example, a mini game can include lessons to learn Abstract Words. The user could be required to spell the Abstract Words. The M.E. Tech allows the user to interact with letters and words of by tumbling them, rotating them (yaw, pitch, roll) until they are arranged in the correct orientation and formation. Completing the spelling activity correctly can unlock various other game elements, some educational and others just pure entertainment, for the user to utilize.

In other lessons/games, the user could be required to read sentences that include the Abstract Words, or pick sentences that use the Abstract Words correctly. In such lessons, how the words sound and are used can be taught. For example, the user can be given sentences with Abstract Words in them, and have to select the sentences that use the Abstract Words correctly. In such aspects, a glossary can be supplied that the user can access to refresh himself to the meaning of the word. When teaching how the Abstract Words sounds, the educational teaching application 200 can call upon sound files that accompanying the application 200 and that are stored on the device 100, and call upon the device 100 to "play" the sound via speakers, allowing the user to hear the word. Likewise, the application 200 can be configured to call upon the microphone of the device to listen to the user pronounce the word, and then compare what was said with the stored sound files for accuracy.

In addition, reading comprehension games/lessons can be used. The reading comprehension games/lessons can also track the progress of the user. In addition, various other forms of educational games and lessons can be used. However, in an aspect, the Mind's Eye/Bindu Technology can be used by the user to interact with letters and words by tumbling them, rotating them (yaw, pitch, roll) while learning to be aware of his Mind's Eye and Bindu. Completing the lessons successfully unlocks various adventures the user can go to. Adventures are reading activities that in essence elaborate on the stories and lore of the characters and situations of the game. However, at any time the application 200 registers that the user is not mastering the Abstract Words being tested, the application 200 can present the Bindu/Mind's Eye technology to the user for a refresher on the word.

Figure 44A:
FIGS. 44a-c, 45-47 and 49 are representative screen shots of portions of game play of the educational learning system according to an aspect of the present invention.
Figure 44B:
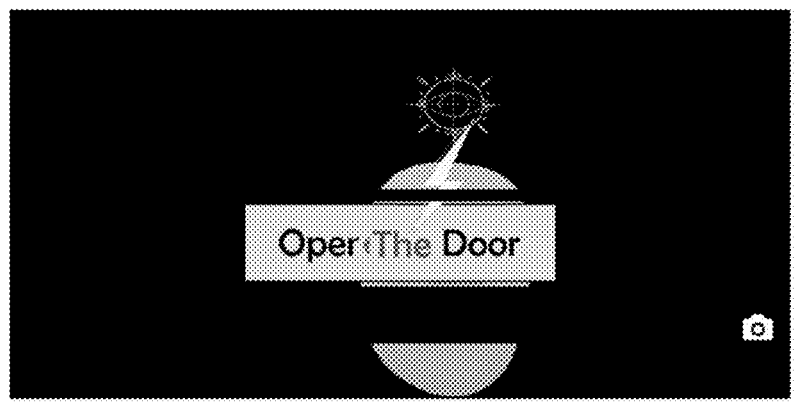
Figure 44C:
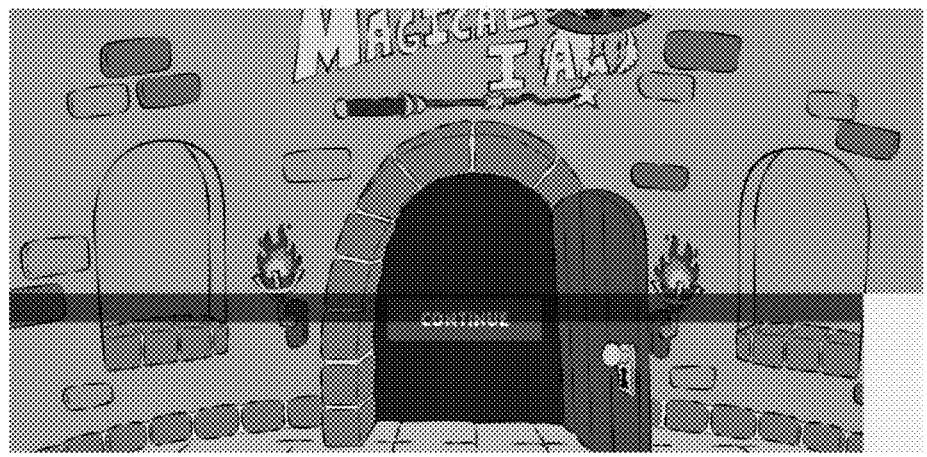

In an aspect, the Bindu M.E. Tech is used to teach learning elements 280 (alphabet letters, numbers, punctuation marks, and Abstract Words) embedded within the adventures, as shown in FIGS. 44*a-c*. The user aligns the Mind's Eye 270 correctly over the Bindu 260 so that the learning elements 280 (THE) are correctly aligned (FIG. 44*a*). Once aligned, the text box can glow, indicating to the user to touch the box (FIG. 44*b*). Upon touching the box, the door is opened, leading to another art of the adventure (FIG. 44*c*).

Each of the adventures have a comprehension quiz at the end, which has to be completed successfully for the child to acquire rewards. For example, the rewards can be virtual badges, coins, points, solar cells, and the like. Successful completion of various lessons/adventures/tests also signals to parents and teachers that the child has successfully exercised his skills with letters, numbers, punctuation marks, and Abstract Words embedded within the adventures, and has comprehended their meanings or use. The Abstract Words learned, are embedded within the adventures, and are designed to be collected by the user, in a fun and engaging manner to mark for the user his progress to successively higher levels of mastery of Abstract Words via the various lessons, adventures, and reading comprehension tests.

In an aspect, the Bindu and Mind's Eye technologies can be incorporated into any known interactive computer activity like reading or known video game formats. For example, the technology can be utilized in adventure games with maps, role playing games (RPG), narrative modules, puzzle games, and the like. Besides the adventures that are reading activities, the user can explore various maps in the game and interact with interesting characters, solve puzzles, and collect reward-objects that require the user to learn Abstract Words with the Bindu M.E. Tech.

In an aspect, to keep the user engaged in utilizing the Bindu M.E. Tech for learning purposes, various other types of game elements or entertainment can be included to refresh the integration of brain function and learning. For example, mini—games and distraction animations can be utilized. Mini-games can take the form of any known game or puzzle. Distraction animations can be any type of—short clip of animations. These mini-games and distraction animations can be placed throughout the educational teaching system. For example, the user can call on these mini-games or distraction animations at any time, or the games and distractions can be placed throughout normal game play or used at times set by the game design. Besides entertaining the user, the mini-games and animations serve the purpose of providing a moment of distraction from the stress of the task of learning to read words and symbols. This momentary distraction helps consolidate the previous learning while the brain returns to an integrated state, ready to learn more. Thus by progressing through the game, mastering lessons, unlocking adventures, playing mini-games, and watching Distraction Animations the user masters the Abstract Words needed to be a fluid reader.

For example, the educational teaching system can include, as a reward or a refreshing distraction, a story-like game. The user can start the program, receiving an introduction to how the game is played, along with various menus and options that are available to the user. The user can assume a character, with a name, and explore his or her environment in the game, include "rooms" and the like associated with the character. Maps and menus can be provided which allow the user to select activities, such as exploring locations within the game environment, accessing a game store which allows the user to purchase goods and tools for his character, and the like. Various characters can be involved in the game as well, all requiring the help of the user at some point. By providing these various activities, a user can pace himself so that the stress of learning to read does not become overwhelming and diminish the user's ability to learn. Further, these various activities reward and entertain fast-moving users.

Users can select activities that allow them to continue to build their reading comprehension or skill. For example, a user can select an activity that allows them to learn new words. The activity can present the three parts of a new word with how the word looks like, sounds like and means (called the Mantra in game mode), and require the user to correctly align and orient the word using the Bindu M.E. Tech. discussed above. The new word can be a Concrete or Abstract Word. Once the letters of the word have been correctly sequenced and oriented by aligning the Mind's Eye with the Bindu, the system, via a game character for example, can teach the rest of the components of the word, or explain the word, to the user, providing the sound (via an audio component) and the meaning of the word (via definition and illustration of the definition). In addition, the word can be presented in context, for example in a few sentences.

Figure 45:
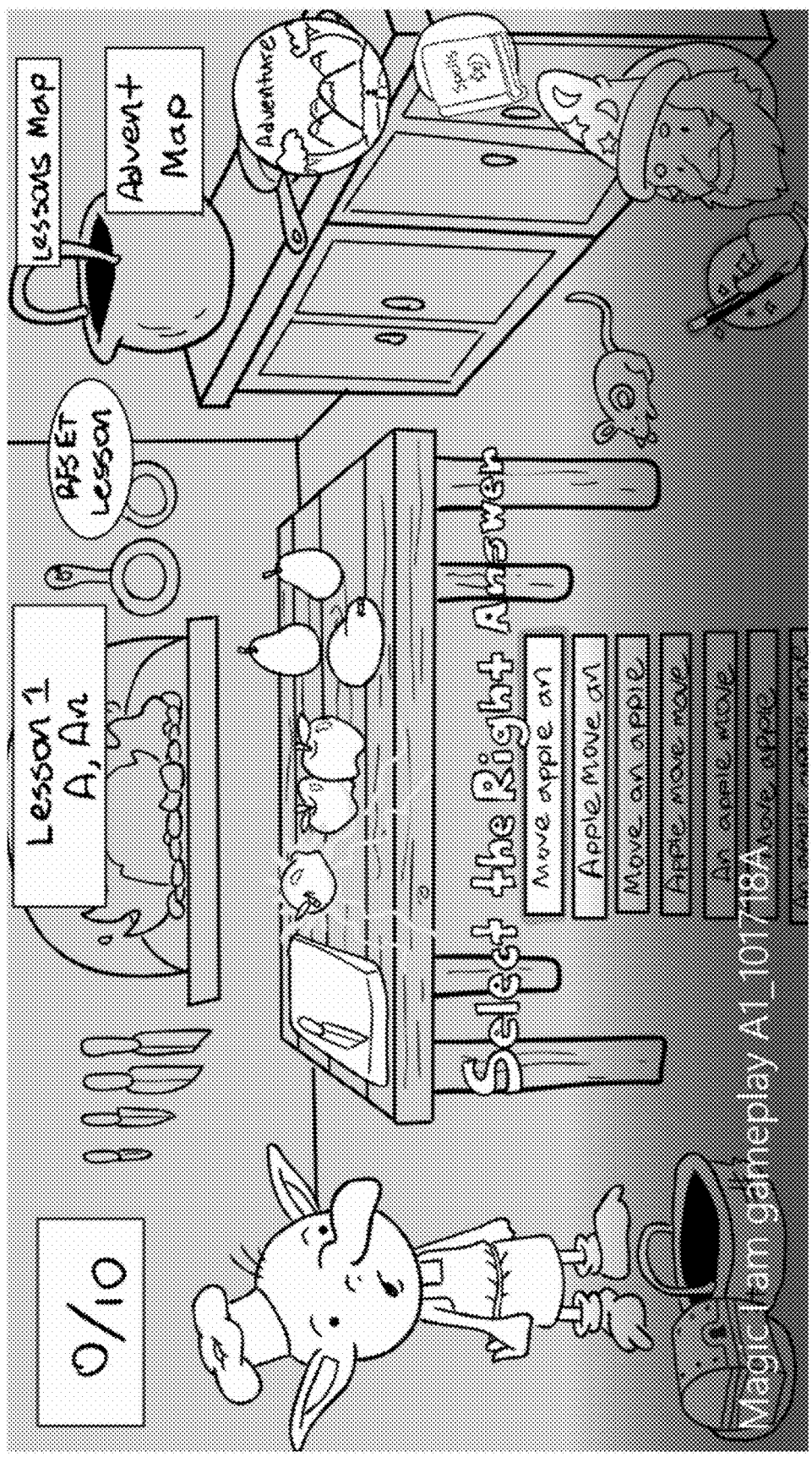

Once that has been done, the system can then present the word in a grouping of sentences (see FIG. 45), with only a small portion of the sentences showing the correct use of the word, according to its definition. The user is then required to pick the correct sentence(s). Once the correct sentence(s) is selected, the user can advance within the learning module to learn new words, or into different activities for entertainment. In some aspects, the system can present the same word in multiple different groupings of sentences, and require the user to select the correct sentence from each grouping to advance (e.g., in 3 different consecutive groupings, the correct sentence(s) must be selected 3 times). If the user does not select the correct sentence, the user can be presented with additional chances to select the correct sentence, or go through the Bindu M.E. Tech alignment and education component.

Figure 46:
Figure 47:
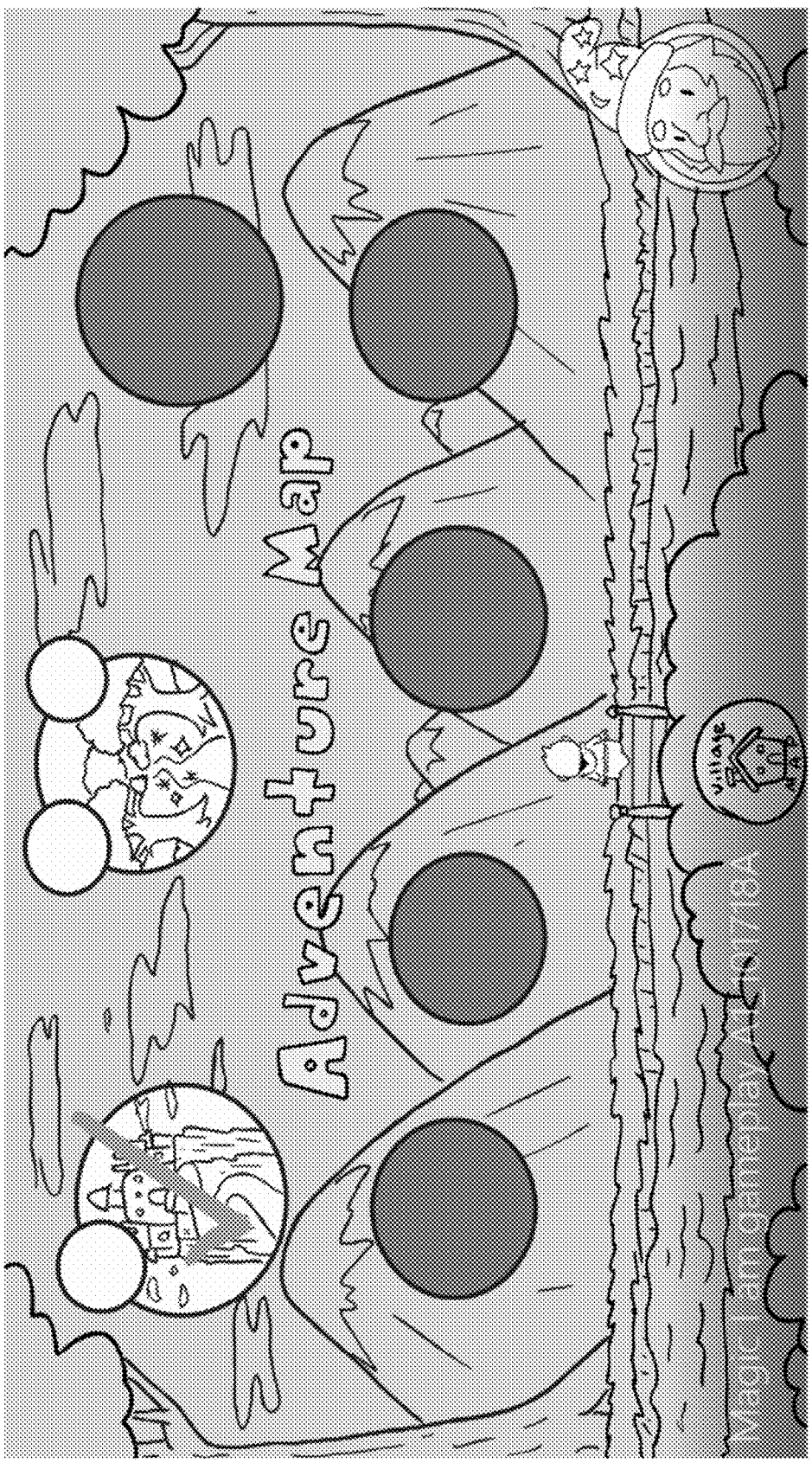

In another aspect, the educational teaching system can also teach reading comprehension, as shown in FIG. 46. Once a user has demonstrated the mastery or comprehension of a given amount of Abstract Words, the user can be presented with a short story that includes those Abstract Words. The reading content can be divided up into chapters or sections of various length. The story can be told through illustrated pages as well as printed text. While reading the story, the user has access to a glossary that assists in teaching the user unfamiliar words. The user, while in various gaming types (adventure, reading comprehension, etc.) can access this glossary to review mastered Abstract Words, and their "mantras", from all the previous chapters he has finished. After the user has read the story, the user's reading comprehension can be tested. In an aspect, the user can be required to pick from a list of sentences all the correct sentences about the illustrated story he just finished reading, as shown in FIG. 46. If the user selects all the correct sentences, the user move on to other chapters and stories, as shown in FIG. 47. If not, the user rereads the story, and gets to demonstrate his comprehension by choosing the correct sentences again, from a new list of sentences, until he succeeds.

In an aspect, the system uses an adaptive content casting module to determine how much the user is learning or is progressing through the game to determine whether or not to provide new content or review old content, or needs a break from the educational components. The adaptive content casting module calculates the learning speed. It does this by taking in a variety of inputs such as accuracy of resolving sentence challenges, number of attempts at completing challenges successfully, speed of challenge completion, rate of using a help menu, etc. and factoring it into mathematical equations. Once the user reaches a benchmark set by the adaptive content casting module, the user can advance. As an example, the adaptive content casting module can have a threshold requirement of passing a challenge within a certain amount of time or with a certain score, or passing the challenge within a number of attempts. If the user meets these thresholds, he can advance in the process. If not, the adaptive content casting module can have him retry the challenge, or send him back to review learning the Mantra for the word. For example, if a user completes the challenge within 2 attempts, his understanding of the material is assumed to be stronger than if he completes the challenge within 7 attempts. In the latter case, the user would need to be encouraged to stay on, by supplying him with simple games to play and boost morale, while in the former case, the learner would be deemed to be a good candidate to move forward with the learning material The adaptive content casting module determines whether or not the user is advancing and is ready for harder challenges, or needs to refresh and do additional review work.

In an aspect, the adaptive content casting module takes parameters of the user's performance as he participates with portions of the educational system to make that determination. For example, the adaptive content casting module can measure the accuracy, speed, and number of attempts of the activities at the various different components. For example, parameters from the word and reading comprehension lessons can include the accuracy (i.e., correct number of answers), number of attempts at the lesson, as well as speed of the quiz completion. In addition, the module can track the number of times a user has used a help function in each of the lesson components. Further, another parameter can be the amount of time that has elapsed since the user was last active with that type of game or lesson, or the average gap of time for a certain number of game plays. From here, the parameters are taken and compared to determine what content (e.g., lessons, minigames, entertainment content) is provided to the user.

FIG. 48 illustrates an overview of the user inputs (parameters) to the outputs (content) according to an aspect of the invention. The more accurate the user is in the word lesson challenges, the more maps he is able to explore, and the more the likelihood of rewards he can collect. (This motivates good readers to further explore the game). The less accurate the user is in word lesson challenges, the fewer the number of maps he is allowed to explore (because it will be too hard for him due to poor reading abilities), but he may be encouraged to linger in the product by being given additional mini-games to play, and animation clips to watch to refresh the integration of his brain for new learning efforts.

If the module determines a user is advancing smoothly, and is ready to move forward, access to new content can be provided (see FIG. 47, where the user can have access to new activities or unlock new areas in the game map). In addition, rewards can be provided as well. These rewards can include badges showing progress, points, energy solar cells, coins, and various other collectable virtual items to show progress. All of these rewards can then be traded in for tools or other things for the user's selected character, as well known in video games.

If the module determines that the user needs more work before advancing, the system can provide previously presented content to remaster (e.g., interact with old characters to relearn the mantra and use of words (FIG. 45)), minigames (solve puzzles, collect objects), or other content to entertain the user to refresh the user's mind). For example, the mini-games can include versions of the Alphabet Game to reassure the user.

The entertainment content can be movie clips or small animation clips. Like the minigames, the entertainment content serves the purpose of providing a moment of distraction from the task of learning words and symbols, which helps consolidate the learning process.

In an aspect, the educational teaching system includes analytic feedback. The analytic feedback module provides the progress of the user to the educator and/or parent to show the user's progress. The analytics show where the user is successful, as well as identifies areas of indicated difficulty. Analytics Feedback gathers data in real-time as the user plays the game. It works in conjunction with adaptive content casting module by filtering out relevant information about the learning speed. Information could be the number of Abstract Word(s) encountered in a session, the number of Abstract Word(s) mastered, the speed of mastery, the number of words the user was exposed to, rate of comprehension, time spent in the game are of particular importance. This data would be sent via email with simple graphs and charts.

In an aspect, the educational teaching application 200 can be downloaded on a mobile device 100 of the user. The application 200 can be made available via various application stores (Google Play, Apple App Store, etc.). In such aspects, the application 200 can be required for the user to establish an account. In such aspects, the application 200 can communicate with a central server associated with the application. The central server can take the form of a traditional server or computing device, including processors, memory, input and outputs, communication means, various other applications, and databases to store account information of the users. In an aspect, the user can identify other individuals to which updates can be reported. For example, a user can be a child, and the other individuals can be parents, teachers, or other individuals who supervise the child. In such instances, the application can be configured to send updates to the central server, which will then send such updates on to the supervisors discussed above.

Figure 49:

In an aspect, the educational teaching system 10 can also include a game module (e.g., the Dot Com Dash Rhythm Game™) where the user is asked to move his fingertips across a sentence that is displayed on the screen, as shown in FIG. 49, and read out the sentence using a punctuation rhythm. The punctuation rhythm can include pauses and hesitations as indicated by the type of punctuation utilized in the sentence. The pauses can be a hesitate/yield, a half-stop, and a full-stop. A yield can be employed at Commas, Quotation Mark, or Quotation Marks. Half stops occur at semi-colons, dashes, and ellipses. Full stops occur at colons, periods, question mark, exclamation mark, parenthesis, and brackets. For the example shown in FIG. 49, the sentence would include indicating a hesitate and a full stop as the user reads the sentence while dragging his finger across it. The Hesitate would be activated when the user arrives at the comma, and the full stop would be indicated when he arrives at the question mark. For this, our technology allows for voice recognition to measure the words spoken by the player, as well as his touch screen persistence, to measure how his fingertips move across the sentence and pausing at the punctuation marks.

Having thus described exemplary embodiments of the present invention, those skilled in the art will appreciate that the disclosures within are exemplary only and that various other alternatives, adaptations and modifications may be made within the scope of the present invention. Accordingly, the present invention is not limited to the specific embodiments described herein.

What is claimed is:

1. A method for improving reading skills of a user with reading disability systems through use of a mobile device or interactive computer, the method comprising:

generating a graphical representation of a first focusing point, said first focusing point presented above a head of the user;

generating a graphical representation of a second focusing point on a. display;

generating learning elements on the display, wherein the learning elements are shown in an unobstructed view when the graphical representation of the first focusing point is aligned with said graphical representation of the second focusing point; and determining the user's level of progress in completing one or more reading skill challenges on said mobile device or interactive computer by setting a threshold to measure said user's progress in completing said one or more reading skills challenges as determined by the number of attempts it takes to complete said one or more reading skill challenges and the amount of time it takes the user to complete said one or more reading skill challenges;

wherein if the user meets said threshold, said user can advance to one or more additional reading skill challenges, and. if the user fails to meet said threshold, the user is directed to retry said one or more reading skills challenges previously attempted.

2. The method of claim 1, wherein generating the graphical representation of the first focusing point comprises:

a. capturing an image of the user's head with a mobile device;

b. displaying the image of the user's head on a display of the mobile device; and c. generating the graphical representation of the first focusing point on the display;

wherein the graphical representation of the first focusing point is in a fixed position in relation to the user's head, moving with the user's head as the user's head moves.

3. The method of claim 2, wherein the graphical representation of the first focusing point is placed in a fixed position in relation to the user's head by generating a mapped virtual head of the user's head, establishing a center point of the user's head, and placing the graphical representation of the first focusing point at a fixed distance from the center point.

4. The method of claim 1, wherein movement of the graphical representation of the second focusing point is tied to the rotational movement of the mobile device by the user, wherein the user rotates the mobile device in order to align the graphical representation of the second focusing point with the graphical representation of the first focusing point.

5. The method of claim 4, wherein spatial orientation of the learning elements is tied to a location of the graphical representation of the second focusing point in relation to the graphical representation of the first focusing point, wherein the spatial orientation of the learning elements produces an obstructed view of the learning elements when the graphical representation of the second focusing point is not aligned with the graphical representation of the first focusing point.

6. The method of claim 1, wherein the learning elements comprise 3-D representations of 2-D letters, numbers, punctuation, and abstract words.

7. The method of claim 1 where the threshold is based on number of attempts.

8. The method of claim 7 wherein if the user completes one or more reading skill challenges within 2 attempts, said user is allowed to move forward with additional reading skills challenges, wherein if the user completes one or more reading skills challenges after 7 attempts, said user is supplied with easier reading skills challenges.

9. A method for improving reading skills of a user with reading disability systems through use of a mobile device or interactive computer, the method comprising:
- generating a graphical representation of a first focusing point, said first focusing point presented above a head of the user;
- generating a graphical representation of a second focusing point on a display;
- generating learning elements on the display, wherein the learning elements are shown in an unobstructed view when the graphical representation of the first focusing point is aligned with said graphical representation of the second focusing point; and
- determining the user's level of progress in completing one or more reading skill challenges on said mobile device or interactive computer by setting a threshold to measure said user's progress in completing said one or more reading skills challenges;
- wherein if the user meets said threshold, said user can advance to one or more additional reading skill challenges, and if the user fails to meet said threshold, the user is directed to retry said one or more reading skills challenges previously attempted.

10. An educational teaching system for improving reading skills of users with reading disability symptoms, the system comprising a mobile device or interactive computer comprising:
   a. memory;
   b. a. processor;
   c. a display;
   d. A front facing camera oriented with the display; and
   e. input/output devices,
   wherein the processor is configured to:
   i. capture images of the user from the front facing camera;
   ii. create a virtual mapped version of a head of the user;
   iii. create a graphical representation of a focusing point, said focusing point put into a locked positional relationship to the mapped head of the user;
   iv. create a graphical representation of a viewpoint;
   v. create learning elements, wherein the learning elements take a three dimensional (3-D) form, wherein the viewpoint and the learning elements are in a positional relationship with the mobile device or interactive computer in relation to the head of the user, so that the viewpoint moves around the display in relation to the focusing point as the mobile device is rotated, wherein the spatial orientation of the learning elements are in relation to the position of the viewpoint so that when said viewpoint is aligned with the focusing point, the learning elements are aligned in an unobstructed correct alignment, and when the viewpoint is not located on the focusing point, the learning elements are aligned in an unobstructed spatial view; and
   vi. determine the user's level of progress in completing one or more reading skill challenges on said mobile device or interactive computer by setting a threshold to measure said user's progress in completing said one or more reading skills challenges as determined by the number of attempts it takes to complete said one or more reading skill challenges and the amount of time it takes the user to complete said one or more reading skill challenges so that if the user meets said threshold, said user can advance to one or more additional reading skill challenges, and if the user fails to meet said threshold, the user is directed to retry said one or more reading skills challenges previously attempted.

11. The educational teaching system of claim 10, wherein the input/output devices comprise a gyroscope, wherein the gyroscope is configured to measure the rotational movement of the mobile device, and wherein the gyroscope provides the change in the rotational movement to move the viewpoint in relation to the focusing point as the mobile device or interactive computer is rotated.

12. The educational teaching system of claim 10, wherein creating the viewpoint further comprises generating a virtual grid that is locked to the mapped head of the user, and wherein the viewpoint moves within the virtual grid.

13. The educational teaching system of claim 12, wherein the virtual grid comprises a yaw axis, a pitch axis, and a roll axis, wherein the yaw axis corresponds to a yaw rotation of the mobile device, the pitch axis corresponds to a pitch rotation of the mobile device, and the roll axis corresponds to a roll rotation of the mobile device or interactive computer.

14. The educational teaching system of claim 13, wherein the virtual gird further comprises points at which the axes intersect, wherein the viewpoint is generated at one of the points, and wherein the points dictate the required rotations needed to move the viewpoint to align with the focusing point.

15. The educational teaching system of claim 14, wherein the points dictate the spatial orientation of the learning elements as initially displayed on the device.

16. The educational teaching system of claim 10, wherein the focusing point is created by finding a center point of the virtual mapped head of the user and placing the focusing point at a given distance above the center point.

17. The educational teaching system of claim 10, wherein the focusing point is placed at approximately three inches above the virtual mapped head.

18. The educational teaching system of claim 10, wherein the learning elements comprise 3-D representations of 2-D letters, numbers, punctuation, and abstract words.

* * * * *